United States Patent
Zhang

(10) Patent No.: US 10,823,577 B2
(45) Date of Patent: Nov. 3, 2020

(54) NAVIGATION METHOD AND NAVIGATION DEVICE

(71) Applicant: Huawei Technologies Co., Ltd., Shenzhen (CN)

(72) Inventor: Xiaoping Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 221 days.

(21) Appl. No.: 15/781,362

(22) PCT Filed: Dec. 3, 2015

(86) PCT No.: PCT/CN2015/096329
§ 371 (c)(1),
(2) Date: Jun. 4, 2018

(87) PCT Pub. No.: WO2017/092008
PCT Pub. Date: Jun. 8, 2017

(65) Prior Publication Data
US 2019/0316917 A1    Oct. 17, 2019

(51) Int. Cl.
*G01C 21/34*   (2006.01)
*H04W 4/029*   (2018.01)
*G01C 21/36*   (2006.01)
*H04W 4/02*    (2018.01)

(52) U.S. Cl.
CPC ....... *G01C 21/3407* (2013.01); *G01C 21/362* (2013.01); *H04W 4/026* (2013.01); *H04W 4/029* (2018.02)

(58) Field of Classification Search
CPC ..................................................... G01C 21/34
USPC ......................................................... 701/533
See application file for complete search history.

(56) References Cited

U.S. PATENT DOCUMENTS

| | | | |
|---|---|---|---|
| 6,192,314 B1 | 2/2001 | Khavakh et al. |
| 8,320,939 B1 | 11/2012 | Vincent |
| 8,489,326 B1 | 7/2013 | Na et al. |
| 2007/0001904 A1 | 1/2007 | Mendelson |

(Continued)

FOREIGN PATENT DOCUMENTS

| CN | 201365346 Y | 12/2009 |
|---|---|---|
| CN | 101672653 A | 3/2010 |

(Continued)

OTHER PUBLICATIONS

Machine Translation and Abstract of Chinese Publication No. CN104897165, Sep. 9, 2015, 13 pages.

(Continued)

*Primary Examiner* — Jason C Olson
(74) *Attorney, Agent, or Firm* — Conley Rose, P.C.

(57) ABSTRACT

A navigation method including obtaining location data of a current location of a terminal, obtaining location data of a destination, where first location data in pre-stored navigation data matches the location data of the current location, and second location data in the pre-stored navigation data matches the location data of the destination, outputting a first navigation instruction when a relationship between the first location data and the second location data is the same as a preset relationship between a current location and a destination, and outputting a second navigation instruction if a relationship between the first location data and the second location data is opposite to a preset relationship between a current location and a destination.

20 Claims, 18 Drawing Sheets

(56) References Cited

U.S. PATENT DOCUMENTS

| | | |
|---|---|---|
| 2013/0281111 A1 | 10/2013 | Syrjarinne et al. |
| 2014/0067256 A1 | 3/2014 | Aoki et al. |
| 2014/0195156 A1 | 7/2014 | Yamamoto et al. |
| 2015/0094094 A1 | 4/2015 | Rochberger et al. |
| 2015/0204676 A1 | 7/2015 | Zhang et al. |
| 2015/0308835 A1 | 10/2015 | Hansen et al. |

FOREIGN PATENT DOCUMENTS

| | | |
|---|---|---|
| CN | 102419180 B | 1/2014 |
| CN | 103492837 A | 1/2014 |
| CN | 103620347 A | 3/2014 |
| CN | 104280045 A | 1/2015 |
| CN | 104655127 A | 5/2015 |
| CN | 104699104 A | 6/2015 |
| CN | 104736968 A | 6/2015 |
| CN | 104897165 A | 9/2015 |
| CN | 104144495 B | 5/2016 |
| CN | 104034338 B | 8/2017 |
| WO | 2014026338 A1 | 2/2014 |

OTHER PUBLICATIONS

Machine Translation and Abstract of Chinese Publication No. CN201365346, Dec. 16, 2009, 12 pages.

Foreign Communication From A Counterpart Application, PCT Application No. PCT/CN2015/096329, English Translation of International Search Report dated Sep. 1, 2016, 2 pages.

Foreign Communication From A Counterpart Application, PCT Application No. PCT/CN2015/096329, English Translation of Written Opinion dated Sep. 1, 2016, 4 pages.

Spassov, I., "Algorithms for Map-Aided Autonomous Indoor Pedestrian Positioning and Navigation," XP055022079, Nov. 23, 2007, 134 pages.

Foreign Communication From A Counterpart Application, European Application No. 15909525.6, Extended European Search Report dated Oct. 19, 2018, 12 pages.

Machine Translation and Abstract of Chinese Publication No. CN101672653, Mar. 17, 2010, 22 pages.

Machine Translation and Abstract of Chinese Publication No. CN104280045, Jan. 14, 2015, 18 pages.

Machine Translation and Abstract of Chinese Publication No. CN104655127, May 27, 2015, 20 pages.

Machine Translation and Abstract of Chinese Publication No. CN104699104, Jun. 10, 2015, 18 pages.

Foreign Communication From A Counterpart Application, Chinese Application No. 201580079542.5, Chinese Office Action dated May 21, 2019, 9 pages.

Machine Translation and Abstract of Chinese Publication No. CN102419180, Jan. 1, 2014, 16 pages.

Machine Translation and Abstract of Chinese Publication No. CN104034338, Aug. 29, 2017, 16 pages.

Machine Translation and Abstract of Chinese Publication No. CN104144495, May 11, 2016, 10 pages.

NAVIGATION METHOD AND NAVIGATION DEVICE

CROSS REFERENCE TO RELATED APPLICATION

This application is a national stage of International Application No. PCT/CN2015/096329, filed on Dec. 3, 2015, which is hereby incorporated by reference in its entirety.

TECHNICAL FIELD

Embodiments of the present disclosure relate to the field of navigation technologies, and in particular, to a navigation method and a navigation device.

BACKGROUND

A navigation technology is a technology about how a person or device initiating a navigation request is guided to a destination. An outdoor navigation technology based on a system such as the Global Positioning System (GPS) was developed early, and has been widely applied in all lines of business and industries transportation means such as cars and steamboats, or a consumer electronics field such as smartphones. In recent years, with rapid development of smartphones, mobile Internet, and e-commerce, indoor navigation has become a hot technology attracting much attention from the industry.

Path planning is a main navigation manner currently used for an electronic product. According to a principle of path planning, location information of a user is first obtained, destination location information is obtained according to user's selection, and a navigation path is obtained by means of map databased calculation and is displayed to the user in a graphics form. Further, voice navigation may be used to assist in guiding the user.

A path planning based navigation technology has been widely applied, but the technology mainly focuses on the field of outdoor navigation. For indoor navigation, there are several problems as follows.

(1) An indoor map is required. However, there are relatively few indoor map resources at present, and indoor navigation cannot be implemented in most places.

(2) Indoor positioning is required. However, an indoor positioning technology is immature at present, and positioning accuracy is low.

SUMMARY

Embodiments of the present disclosure provide a navigation method and a navigation device in order to implement a navigation function without a map and positioning.

A first aspect of the embodiments of the present disclosure provides a navigation method, where the method is used for a first area, the first area includes a first path, and the method includes obtaining location data of a current location of a terminal, obtaining location data of a destination, where both the current location and the destination are included in the first path, where first location data in pre-stored navigation data matches the location data of the current location, and second location data in the pre-stored navigation data matches the location data of the destination, and outputting a first navigation instruction if a relationship between the first location data and the second location data is the same as a preset relationship between a current location and a destination, where the first navigation instruction is used to instruct a user to move in a first direction, and the first direction is a direction corresponding to the first location data, or outputting a second navigation instruction if a relationship between the first location data and the second location data is opposite to a preset relationship between a current location and a destination, where the second navigation instruction is used to instruct a user to move in a second direction, and the second direction is a direction obtained after the first direction rotates 180°, where a point S is any location point in the first path, and location data of the point S is data that is used to identify the point S and that can be obtained by the terminal when the terminal is at the point S.

In the technical solution, the first location data matching the location data of the current location and the second location data matching the location data of the destination are obtained by means of matching using the pre-stored navigation data, and a navigation instruction is provided according to the relationship between the first location data and the second location data and the preset relationship between a current location and a destination. In this way, a navigation function can be implemented in the specific area without a map and positioning.

In a first possible implementation of the first aspect, the location data of the point S includes any one or more of the following an identifier and a characteristic of each wireless signal that are used to identify the point S and that can be received by the terminal when the terminal is at the point S, where the identifier is used to identify a wireless node sending the wireless signal, and the characteristic of the wireless signal is used to indicate a relationship between the terminal and the wireless node sending the wireless signal, in the technical solution, location data of each location point in the specific area can be obtained, provided that an electronic device that is carried passes through the specific area and there is a wireless node in the specific area, and therefore the identifier and the characteristic of the wireless signal form the location data such that measurement is simplified and a measurement workload is reduced compared with other approaches in which a map is obtained by means of measurement using a special-purpose map measuring instrument, and a sensor signal that is used to identify the point S and that can be collected by the terminal when the terminal is at the point S, where the sensor signal includes any one or more of a geomagnetic signal, a light signal, or a pneumatic signal, in the technical solution, the location data of the point S in the specific area can be obtained, provided that an electronic device that is carried passes through the specific area and the electronic device has an acceleration sensor, a gyroscope, or a geomagnetic sensor, and therefore the sensor signal forms the location data such that measurement is simplified and a measurement workload is reduced compared with the other approaches in which a map is obtained by means of measurement using a special-purpose map measuring instrument.

With reference to the first possible implementation of the first aspect, in a second possible implementation, the characteristic of the wireless signal includes any one or more of a received signal strength of the wireless signal received by the terminal, a distance between the terminal and the wireless node sending the wireless signal, a radiation angle of a signal between the terminal and the wireless node sending the wireless signal, an angle of arrival of a signal between the terminal and the wireless node sending the wireless signal, a time of arrival of a signal between the terminal and the wireless node sending the wireless signal, or a time difference of arrival of signals between the terminal and the wireless node sending the wireless signal.

With reference to any one of the first aspect, or the first and the second possible implementation of the first aspect, in a third possible implementation, the first path includes M location points, the pre-stored navigation data includes at least the following location data of each of the M location points, direction information of each location point, and sequence information of each location point, the direction information of the location points is used to indicate moving directions in which the location points are passed through from a start point of the first path to an end point of the first path, and the sequence information of the location points is used to indicate a sequence in which the location points are passed through from the start point of the first path to the end point of the first path, where the sequence information of the location points from the start point of the first path to the end point of the first path is in ascending order or in descending order.

With reference to the third possible implementation of the first aspect, in a fourth possible implementation, outputting a first navigation instruction if a relationship between the first location data and the second location data is the same as a preset relationship between a current location and a destination, or outputting a second navigation instruction if a relationship between the first location data and the second location data is opposite to a preset relationship between a current location and a destination includes in the pre-stored navigation data, the sequence information of the location points from the start point of the first path to the end point of the first path is in ascending order, and outputting the first navigation instruction if sequence information corresponding to the first location data is less than sequence information corresponding to the second location data, or outputting the second navigation instruction if sequence information corresponding to the first location data is greater than sequence information corresponding to the second location data.

With reference to the third possible implementation of the first aspect, in a fifth possible implementation, outputting a first navigation instruction if a relationship between the first location data and the second location data is the same as a preset relationship between a current location and a destination, or outputting a second navigation instruction if a relationship between the first location data and the second location data is opposite to a preset relationship between a current location and a destination includes in the pre-stored navigation data, the sequence information of the location points from the start point of the first path to the end point of the first path is in descending order, and outputting the first navigation instruction if sequence information corresponding to the first location data is greater than sequence information corresponding to the second location data, or outputting the second navigation instruction if sequence information corresponding to the first location data is less than sequence information corresponding to the second location data.

With reference to the third possible implementation of the first aspect, in a sixth possible implementation, the method further includes outputting an indication that a destination is reached if a difference between sequence information corresponding to the first location data and sequence information corresponding to the second location data is less than or equal to a preset threshold.

In the foregoing technical solution, a navigation direction can be determined according to the direction information of the location point of the current location of the terminal, the sequence information corresponding to the first location data, and the sequence information corresponding to the second location data provided that the location point is determined, and therefore navigation efficiency is improved compared with a solution in which a navigation direction is determined after surroundings of a location point are identified.

With reference to any one of the first aspect, or the first to the sixth possible implementations of the first aspect, in a seventh possible implementation, obtaining location data of a destination includes receiving the location data of the destination sent by a first device, where in the technical solution, when the first device is a device carried in a lost article or carried by a missing child and a lost article is used as an example, navigation data of each location point in a moving track of the first device is obtained and a current location of the first device is determined as the destination, to help the user to find the lost article, and further, multiple terminals may share the location data of the destination sent by the first device such that the multiple terminals can search for the lost article jointly, thereby improving search efficiency, using previously obtained location data of a location point as the location data of the destination, where in the technical solution, the location data, recorded in advance, of the location point is used as the location data of the destination such that manual input is not required and an operation is simple, or obtaining an identifier, entered by the user on the terminal, of the destination, and obtaining, from the pre-stored navigation data, the location data of the destination that is corresponding to the identifier of the destination, where in the technical solution, the pre-stored navigation data further includes an identifier corresponding to a location point such that the user can manually enter the identifier of the destination and an operation is flexible.

With reference to any one of the first aspect, or the first to the seventh possible implementations of the first aspect, in an eighth possible implementation, after outputting a first navigation instruction or a second navigation instruction, the method further includes obtaining location data of a next location of the terminal, if in the pre-stored navigation data, there is no location data matching the location data of the next location, starting to obtain a moving track of the terminal, and outputting a third navigation instruction according to the obtained moving track of the terminal, where the third navigation instruction is used to instruct the user to return to a previous location of the next location, and the pre-stored navigation data includes location data matching location data of the previous location of the next location.

With reference to any one of the first aspect, or the first to the seventh possible implementations of the first aspect, in a ninth possible implementation, after outputting a first navigation instruction or a second navigation instruction, the method further includes obtaining location data of a next location of the terminal, if in the pre-stored navigation data, there is no location data matching the location data of the next location, outputting a fourth navigation instruction according to a moving direction of the terminal when the location data of the next location is obtained and direction information of a previous location of the next location, where the fourth navigation instruction is used to instruct the user to return to the first path, and the pre-stored navigation data includes location data matching location data of the previous location of the next location and corresponding direction information.

In the foregoing technical solution, if in the pre-stored navigation data, there is no location data matching the location data of the next location of the terminal, it indicates that the user has deviated from a normal track. In this case, navigation is used to help the user to return to the normal track.

A second aspect of the present disclosure provides a navigation method, where the method is used for a second area, the second area includes at least two paths, the at least two paths include K intersections, K is greater than or equal to 1, and the method includes obtaining location data of a current location of a terminal, obtaining location data of a destination, where the current location and the destination are included in the at least two paths, where first location data in pre-stored navigation data matches the location data of the current location, and second location data in the pre-stored navigation data matches the location data of the destination, obtaining, according to the first location data, the second location data, and the pre-stored navigation data, a location data sequence corresponding to a walking route from the current location to the destination, where the location data sequence includes location data of at least two location points, the at least two location points are included in the at least two paths, the at least two location points include at least one of the K intersections, and a first intersection is a location point, of the at least one intersection, in a same path as the current location, and outputting a first navigation instruction if a relationship between the first location data and location data corresponding to the first intersection is the same as a preset relationship between a current location and a destination, where the first navigation instruction is used to instruct a user to move in a first direction, and the first direction is a direction corresponding to the first location data, or outputting a second navigation instruction if a relationship between the first location data and location data corresponding to the first intersection is opposite to a preset relationship between a current location and a destination, where the second navigation instruction is used to instruct a user to move in a second direction, and the second direction is a direction obtained after the first direction rotates 180°, where a point S is any location point in the at least two paths, and location data of the point S is data that is used to identify the point S and that can be obtained by the terminal when the terminal is at the point S.

In the technical solution, the first location data matching the location data of the current location and the second location data matching the location data of the destination are obtained by means of matching using the pre-stored navigation data, the location data sequence is obtained according to the first location data, the second location data, and the pre-stored navigation data, and a navigation instruction is provided according to the location data sequence. In this way, a navigation function can be implemented in the specific area including the at least two paths without a map and positioning.

In a first possible implementation of the second aspect, the location data of the point S includes any one or more of an identifier and a characteristic of each wireless signal that are used to identify the point S and that can be received by the terminal when the terminal is at the point S, where the identifier is used to identify a wireless node sending the wireless signal, and the characteristic of the wireless signal is used to indicate a relationship between the terminal and the wireless node sending the wireless signal. In the technical solution, location data of each location point in the specific area can be obtained, provided that an electronic device that is carried passes through the specific area and there is a wireless node in the specific area, and therefore the identifier and the characteristic of the wireless signal form the location data such that measurement is simplified and a measurement workload is reduced compared with the other approaches in which a map is obtained by means of measurement using a special-purpose map measuring instrument, and a sensor signal that is used to identify the point S and that can be collected by the terminal when the terminal is at the point S, where the sensor signal includes any one or more of the following a geomagnetic signal, a light signal, or a pneumatic signal. in the technical solution, the location data of the point S in the specific area can be obtained, provided that an electronic device that is carried passes through the specific area and the electronic device has an acceleration sensor, a gyroscope, or a geomagnetic sensor, and therefore the sensor signal forms the location data such that measurement is simplified and a measurement workload is reduced compared with the other approaches in which a map is obtained by means of measurement using a special-purpose map measuring instrument.

With reference to the first possible implementation of the second aspect, in a second possible implementation, the characteristic of the wireless signal includes any one or more of a received signal strength of the wireless signal received by the terminal, a distance between the terminal and the wireless node sending the wireless signal, a radiation angle of a signal between the terminal and the wireless node sending the wireless signal, an angle of arrival of a signal between the terminal and the wireless node sending the wireless signal, a time of arrival of a signal between the terminal and the wireless node sending the wireless signal, or a time difference of arrival of signals between the terminal and the wireless node sending the wireless signal.

With reference to the first aspect, or the first or the second possible implementation of the first aspect, in a third possible implementation, the at least two paths include M location points, the pre-stored navigation data includes at least the following location data of each of the M location points, direction information of each location point, and sequence information and a path identifier of each location point, the direction information of the location points is used to indicate moving directions in which the location points are passed through from a start point of a path in which the location points are located to an end point of the path in which the location points are located, and the sequence information of the location points is used to indicate a sequence in which the location points are passed through from the start point of the path in which the location points are located to the end point of the path in which the location points are located, where the sequence information of the location points from the start point of the path in which the location points are located to the end point of the path in which the location points are located is in ascending order or in descending order, and the path identifiers of the location points are used to identify the path in which the location points are located.

With reference to the third possible implementation of the second aspect, in a fourth possible implementation, the pre-stored navigation data further includes information about a distance between any two adjacent location points of the M location points, and obtaining, according to the first location data, the second location data, and the pre-stored navigation data, a location data sequence corresponding to a walking route from the current location to the destination includes obtaining the location data sequence according to the first location data, the second location data, and the pre-stored navigation data, where the location data sequence corresponds to a shortest walking route from the current location to the destination.

In the technical solution, the shortest walking route can be determined according to the information about the distance between the two adjacent location points in the pre-stored navigation data such that a time period for walking to the destination by the user is reduced.

With reference to the third or the fourth possible implementation of the second aspect, in a fifth possible implementation, the outputting a first navigation instruction if a relationship between the first location data and location data corresponding to the first intersection is the same as a preset relationship between a current location and a destination, or outputting a second navigation instruction if a relationship between the first location data and location data corresponding to the first intersection is opposite to a preset relationship between a current location and a destination includes that in the pre-stored navigation data, the sequence information of the location points from the start point of the path in which the current location is located to the end point of the path in which the current location is located is in ascending order, and outputting the first navigation instruction if sequence information corresponding to the first location data is less than sequence information corresponding to the first intersection, or outputting the second navigation instruction if sequence information corresponding to the first location data is greater than sequence information corresponding to the first intersection.

With reference to the third or the fourth possible implementation of the second aspect, in a sixth possible implementation, outputting a first navigation instruction if a relationship between the first location data and location data corresponding to the first intersection is the same as a preset relationship between a current location and a destination, or outputting a second navigation instruction if a relationship between the first location data and location data corresponding to the first intersection is opposite to a preset relationship between a current location and a destination includes that in the pre-stored navigation data, the sequence information of the location points from the start point of the path in which the current location is located to the end point of the path in which the current location is located is in descending order, and outputting the first navigation instruction if sequence information corresponding to the first location data is greater than sequence information corresponding to the first intersection, or outputting the second navigation instruction if sequence information corresponding to the first location data is less than sequence information corresponding to the first intersection.

With reference to the third or fourth possible implementation of the second aspect, in a seventh possible implementation, the method further includes outputting an indication that a destination is reached if a difference between sequence information corresponding to the first location data and sequence information corresponding to the second location data is less than or equal to a preset threshold.

In the foregoing technical solution, a navigation direction can be determined according to the direction information of the location point of the current location of the terminal, the sequence information corresponding to the first location data, and the sequence information corresponding to the second location data provided that the location point is determined, and therefore navigation efficiency is improved compared with a solution in which a navigation direction is determined after surroundings of a location point are identified.

With reference to any one of the second aspect, or the first to the seventh possible implementations of the second aspect, in an eighth possible implementation, obtaining location data of a destination includes receiving the location data of the destination sent by a first device, where in the technical solution, when the first device is a device carried in a lost article or carried by a missing child and a lost article is used as an example, location data of each location point in a moving track of the first device forms the pre-stored navigation data and a current location of the first device is determined as the destination, to help the user to find the lost article, and further, multiple terminals may share the location data of the destination sent by the first device such that the multiple terminals can search for the lost article jointly, thereby improving search efficiency, using previously obtained location data of a location point as the location data of the destination, where in the technical solution, the location data, recorded in advance, of the location point is used as the location data of the destination such that manual input is not required and an operation is simple, or obtaining an identifier, entered by the user on the terminal, of the destination, and obtaining, from the pre-stored navigation data, the location data of the destination that is corresponding to the identifier of the destination, where in the technical solution, the pre-stored navigation data further includes an identifier corresponding to a location point such that the user can manually enter the identifier of the destination and an operation is flexible.

With reference to any one of the second aspect, or the first to the eighth possible implementations of the second aspect, in a ninth possible implementation, after outputting a first navigation instruction or a second navigation instruction, the method further includes obtaining location data of a next location of the terminal, if in the pre-stored navigation data, there is no location data matching the location data of the next location, starting to obtain a moving track of the terminal, and outputting a third navigation instruction according to the obtained moving track of the terminal, where the third navigation instruction is used to instruct the user to return to a previous location of the next location, and the pre-stored navigation data includes location data matching location data of the previous location of the next location.

With reference to any one of the second aspect, or the first to the eighth possible implementations of the second aspect, in a tenth possible implementation, after outputting a first navigation instruction or a second navigation instruction, the method further includes obtaining location data of a next location of the terminal, if in the pre-stored navigation data, there is no location data matching the location data of the next location, outputting a fourth navigation instruction according to a moving direction of the terminal when the location data of the next location is obtained and direction information of a previous location of the next location, where the fourth navigation instruction is used to instruct the user to return to the first path, and the pre-stored navigation data includes location data matching location data of the previous location of the next location and corresponding direction information.

In the foregoing technical solution, if in the pre-stored navigation data, there is no location data matching the location data of the next location of the terminal, it indicates that the user has deviated from a normal track. In this case, navigation is used to help the user to return to the normal track.

A third aspect of the present disclosure provides a navigation device, where the device may be a terminal or a server, the device includes at least the following modules a current location obtaining module, a destination obtaining module, and an output module, and the device executes a part of the method or the whole method in the first aspect using the foregoing modules.

A fourth aspect of the present disclosure further provides a navigation device, where the device includes a network interface, a processor, and a memory, the memory stores a group of programs, and the processor is configured to call the programs stored in the memory such that the device executes a part of the method or the whole method in the first aspect.

A fifth aspect of the present disclosure provides a computer storage medium, where the computer storage medium stores a program, and the program is used to execute some or all steps in the first aspect.

A sixth aspect of the present disclosure provides another navigation device, where the device may be a terminal or a server, the device includes a current location obtaining module, a destination obtaining module, a location data sequence obtaining module, and an output module, and the device executes a part of the method or the whole method in the second aspect using the foregoing modules.

A seventh aspect of the present disclosure further provides a navigation device, where the device includes a network interface, a processor, and a memory, the memory stores a group of programs, and the processor is configured to call the programs stored in the memory such that the device executes a part of the method or the whole method in the second aspect.

An eighth aspect of the present disclosure provides a computer storage medium, where the computer storage medium stores a program, and the program is used to execute some or all steps in the second aspect.

BRIEF DESCRIPTION OF DRAWINGS

To describe embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Herein, some basic concepts in the embodiments of the present disclosure are first described.

The embodiments of the present disclosure are implemented in a specific area. Before a navigation method in the embodiments of the present disclosure is implemented in the specific area, navigation data in the specific area needs to be collected.

Figure 1A:
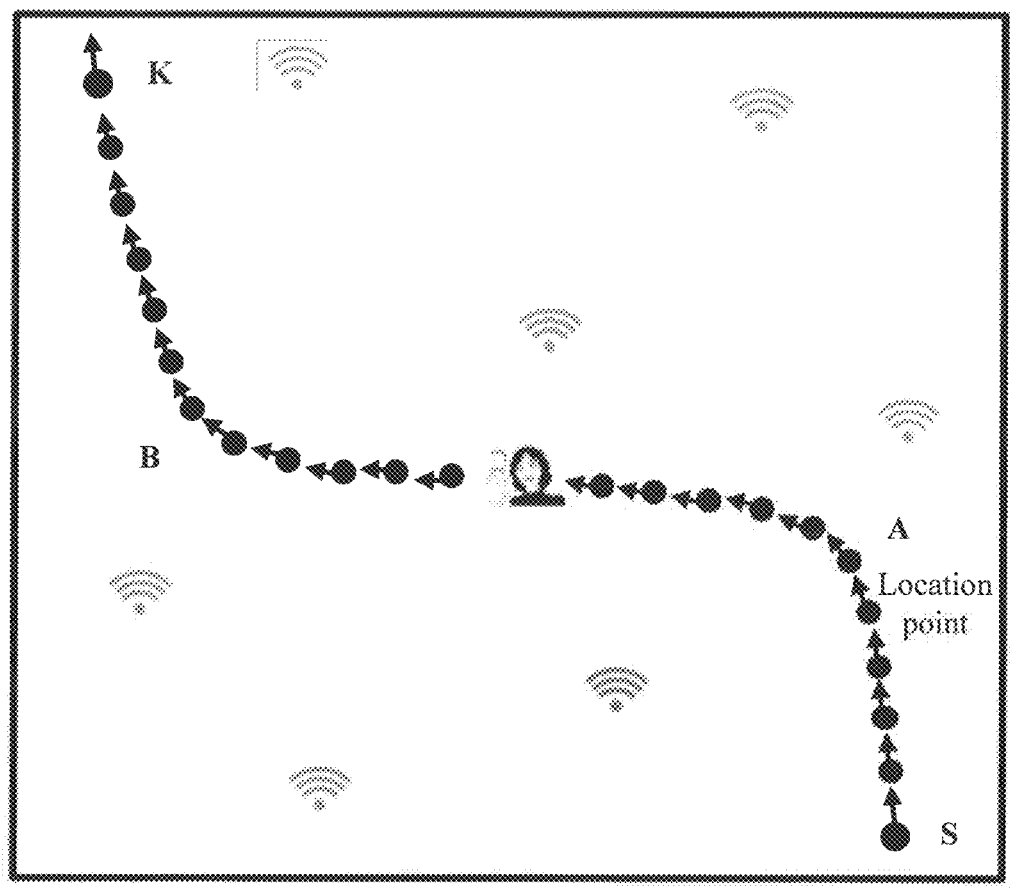
FIG. 1A is a schematic navigation diagram of a path according to an embodiment of the present disclosure.

If the specific area includes one path, as shown in FIG. 1A, and the path includes M location points, the collected navigation data includes at least location data of each of the M location points, direction information of each location point, and sequence information of each location point.

It is assumed that a point S is any location point in the path, and location data of the point S is data that is used to identify the point S and that can be obtained by a terminal when the terminal is at the point S.

The location data of the point S may include any one or more of a first type: an identifier and a characteristic of each wireless signal that are used to identify the point S and that can be received by the terminal when the terminal is at the point S, or a second type: a sensor signal that is used to identify the point S and that can be collected by the terminal when the terminal is at the point S, where the sensor signal includes any one or more of a geomagnetic signal, a light signal, or a pneumatic signal.

The following further describes the first type of location data of the point S.

The first type of location data of the point S is an identifier and a characteristic of each wireless signal that are used to identify the point S and that can be received by the terminal when the terminal is at the point S. The identifier is used to identify a wireless node sending the wireless signal, for example, a name of the wireless node. Assuming that the terminal can detect three wireless nodes at the point S, the location data of the point S may be determined according to names of the three wireless nodes and characteristics of wireless signals transmitted by the three wireless nodes.

The characteristic of the wireless signal includes any one or more of the following.

(1) A received signal strength of the wireless signal received by the terminal. The received signal strength indicator (RSSI) is a strength indicator of the wireless signal that is sent by the wireless node and that is received by the terminal.

Further, the wireless signal node transmits the wireless signal, and the terminal detects the received signal strength of the received wireless signal when receiving the wireless signal. It is assumed that the terminal detects three wireless nodes, names of the wireless nodes are an AP1, an AP2, and an AP3, and received signal strengths of wireless signals transmitted by the wireless nodes are an RSSI1, an RSSI2, and an RSSI3. The location data of the point S may be represented as [(AP1, RSSI1); (AP2, RSSI2); (AP3, RSSI3)].

It should be noted that, in other optional embodiments, alternatively, the terminal may transmit a wireless signal, and the wireless signal node receives the wireless signal transmitted by the terminal. When receiving the wireless signal, the wireless node detects a received signal strength of the received wireless signal, and sends the received signal strength to a server after obtaining the received signal strength, or feeds back the received signal strength to the terminal.

Figure 2:
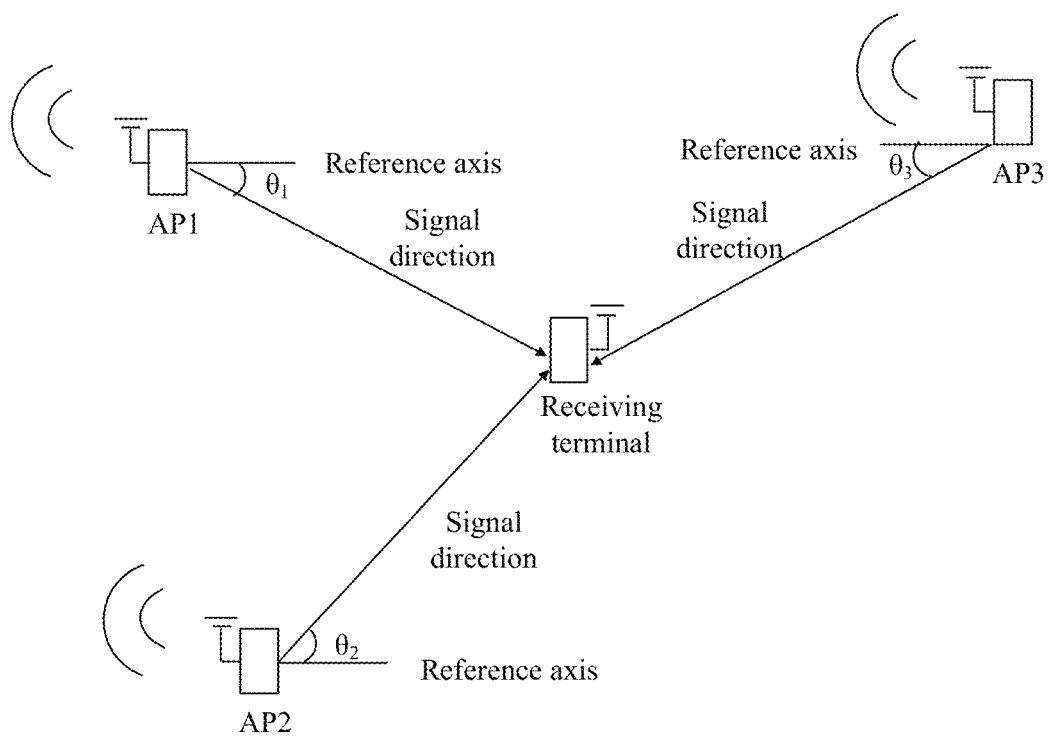
FIG. 2 is a schematic diagram of collecting an angle of arrival of a signal according to an embodiment of the present disclosure.

(2) A radiation angle of a signal between the terminal and the wireless node sending the wireless signal. The radiation angle of the signal is an included angle between a connection line from the wireless node to the terminal and a wireless node reference axis, where the wireless node transmits the wireless signal, and the terminal receives the wireless signal. As shown in FIG. 2, $\theta_1$, $\theta_2$, and $\theta_3$ are radiation angles of signals.

It is assumed that the terminal can detect three wireless nodes at the point S, names of the wireless nodes are an AP1, an AP2, and an AP3, and radiation angles of signals between the terminal and the wireless nodes are $\theta_1$, $\theta_2$, and $\theta_3$. The location data of the point S may be represented as [(AP1, $\theta_1$); (AP2, $\theta_2$); (AP3, $\theta_3$)].

Figure 3:
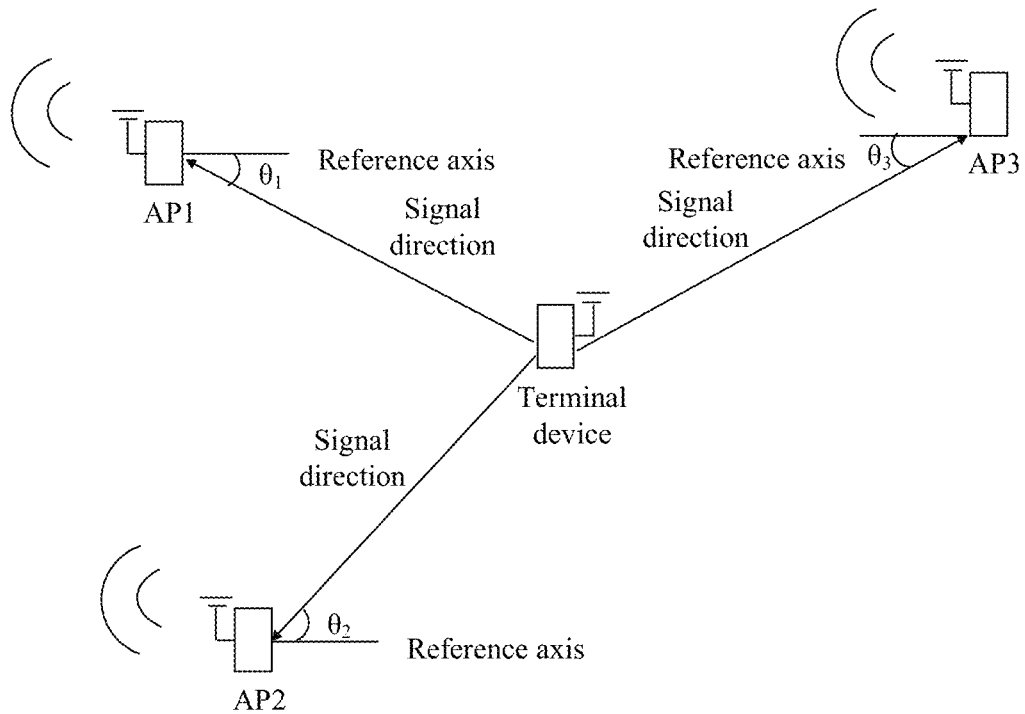
FIG. 3 is a schematic diagram of collecting a radiation angle of a signal according to an embodiment of the present disclosure.

(3) An angle of arrival of a signal between the terminal and the wireless node sending the wireless signal. The angle of arrival of the signal is an included angle between a connection line from the terminal to the wireless node and a wireless node reference axis, that is, an angle formed when the signal is sent to the wireless node, where the terminal transmits the wireless signal, and the surrounding wireless node receives the wireless signal transmitted by the terminal. As shown in FIG. 3, $\theta_1$, $\theta_2$, and $\theta_3$ are angles of arrival of signals.

It is assumed that the terminal can detect three wireless nodes at the point S, names of the wireless nodes are an AP1, an AP2, and an AP3, and angles of arrival of signals between the terminal and the wireless nodes are $\theta_1$, $\theta_2$, and $\theta_3$. The location data of the point S may be represented as [(AP1, $\theta_1$); (AP2, $\theta_2$); (AP3, $\theta_3$)].

It should be noted that, after detecting the angle of arrival of the signal, the wireless node may send the detected angle of arrival of the signal to the server, or feedback the detected angle of arrival of the signal to the terminal.

(4) A time of arrival of a signal between the terminal and the wireless node sending the wireless signal. The time of arrival is a time period from a time point at which the wireless node sends the signal to a time point at which the terminal receives the signal (or from a time point at which the terminal sends the signal to a time point at which the wireless node receives the signal), that is, a time period for transmitting the signal between the wireless node and the terminal.

Further, the wireless node may mark the transmitted wireless signal with a time stamp, and the terminal also marks the wireless signal with a time stamp when receiving the wireless signal. The terminal determines, according to the two time stamps marked for the wireless signal, a time period for transmitting the signal between the wireless node and the terminal. It is assumed that the terminal can detect three wireless nodes at the point S, names of the wireless nodes are an AP1, an AP2, and an AP3, and time periods for transmitting signals between the wireless nodes and the terminal are t1, t2, and t3. The location data of the point S may be represented as [(AP1, t1); (AP2, t2); (AP3, t3)].

It should be noted that, in other optional embodiments, alternatively, the terminal may transmit a wireless signal, and the wireless signal node receives the wireless signal transmitted by the terminal. The terminal marks the transmitted wireless signal with a time stamp, and the wireless node also marks a time stamp when receiving the signal. The wireless node determines, according to the two time stamps marked for the wireless signal, a time period for transmitting the signal between the wireless node and the terminal. After obtaining the transmission time of the wireless signal, the wireless node may send the transmission time to the server, or feedback the transmission time to the terminal.

It should be additionally noted that, there may be several variants and combinations in the present disclosure according to different calculation locations of a transmission time and different storage locations of navigation data. The foregoing specific implementations cannot be used to limit the present disclosure.

(5) A time difference of arrival of signals between the terminal and the wireless node sending the wireless signal.

Optionally, the time difference of arrival of signals may be a difference of times of arrival of signals that are sent by different wireless nodes and that are received by the terminal.

Further, the wireless nodes simultaneously transmit a wireless signal, and the wireless nodes and the terminal are synchronous in time. The terminal may record times of arrival of the wireless signals, and determine a time difference of arrival of wireless signals of every two wireless nodes. Assuming that times of arrival of signals of an AP1, an AP2, and an AP3 that are recorded by the terminal are $T_1$, $T_2$, and $T_3$, time differences of arrival of signals may be represented as follows.

$$TD_{12}=T_1-T_2;$$

$$TD_{23}=T_2-T_3;\text{ and}$$

$$TD_{31}=T_3-T_1.$$

In this case, the location data of the point S may be represented as [(AP1, $TD_{12}$); (AP2, $TD_{23}$); (AP3, $TD_{23}$)].

Optionally, the time difference of arrival of signals may be a difference that is between time points at which two different signals are received and that is calculated by the terminal after a wireless node simultaneously sends the two signals of different transmission speeds and the terminal records the time points at which two different signals are received.

Further, the wireless node may simultaneously transmit two signals of different transmission speeds, for example, simultaneously transmit an ultrasonic signal and a radio frequency signal. The terminal records time points at which the two different signals are received, and determines a time difference according to the recorded time points at which the two different signals are received. The time difference is directly proportional to a distance between the terminal and the wireless node. Assuming that times of arrival of two different signals sent by an AP1, an AP2, and an AP3 that are recorded by the terminal are ($T_{11}$, $T_{12}$), ($T_{21}$, $T_{22}$), and ($T_{31}$, $T_{32}$), respectively, time differences of arrival of signals may be represented as follows.

$$TD_1=T_{11}-T_{12};$$

$$TD_2=T_{21}-T_{22};\text{ and}$$

$$TD_3=T_{31}-T_{32}.$$

In this case, the location data of the point S may be represented as [(AP1, TD1); (AP2, TD2); (AP3, TD3)].

It should be noted that, in other optional embodiments, the terminal may simultaneously send two signals of different transmission speeds, and the wireless node records time points at which the two different signals are received and calculates a time difference between the time points at which the two different signals are received. After receiving the time difference, the wireless node may send the time difference to the server, or feedback the time difference to the terminal.

It should be additionally noted that, there may be several variants and combinations in the present disclosure according to different calculation locations of a time difference and different storage locations of navigation data. The foregoing specific implementations cannot be used to limit the present disclosure.

(6) A distance between the terminal and the wireless node sending the wireless signal.

Further, a manner of detecting the distance by the terminal includes but is not limited to the following several manners.

Manner 1: The terminal determines a distance between a wireless node and the terminal according to a detected received signal strength of a wireless signal. Further, wireless nodes transmit a wireless signal with same transmit power. For a wireless node that is farther from the terminal, a received signal strength of a wireless signal transmitted by the wireless node and received by the terminal is weaker. Therefore, the terminal may determine a distance between the wireless node and the terminal according to the received signal strength of the wireless signal.

Manner 2: The terminal determines a distance between the terminal and a corresponding wireless node according to a time of arrival of a signal and a signal transmission speed. It should be noted that, for a manner of detecting a time of arrival of a signal by the terminal, reference may be made to the foregoing descriptions. Details are not described herein again.

Manner 3: The terminal determines a distance between the terminal and a corresponding wireless node according to a time difference of arrival of signals and a speed difference between different transmission speeds corresponding to two wireless signals that are simultaneously transmitted by the wireless node. It should be noted that, for a manner of detecting a time difference of arrival of signals by the terminal, reference may be made to the foregoing descriptions. Details are not described herein again.

Figure 4:
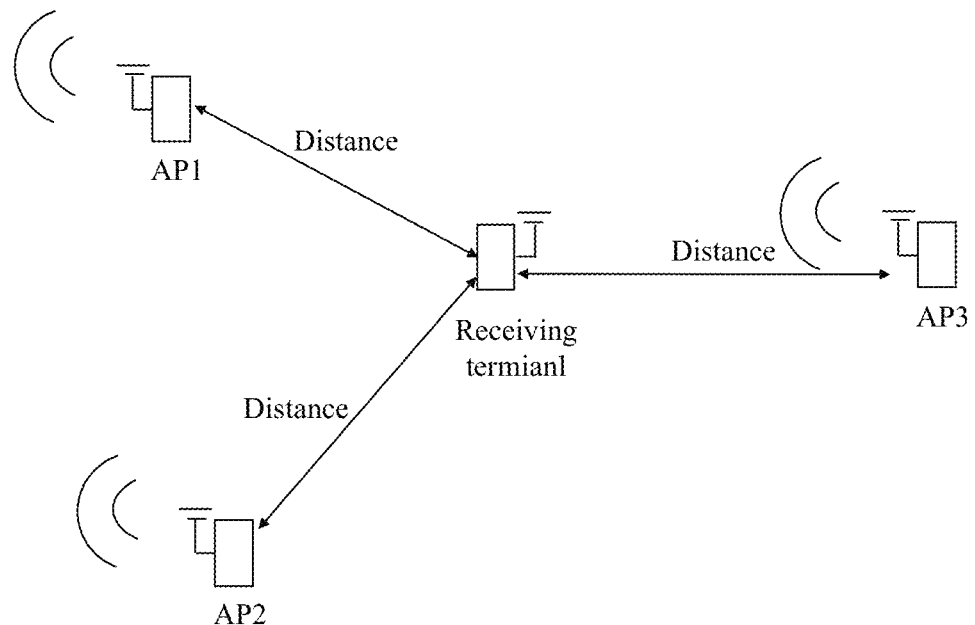
FIG. 4 is a schematic diagram of collecting a distance between a terminal and a signal node according to an embodiment of the present disclosure.

As shown in FIG. 4, it is assumed that the terminal can detect three wireless nodes at the point S, names of the wireless nodes are an AP1, an AP2, and an AP3, and distances between the terminal and the wireless nodes are d1, d2, and d3. The location data of the point S may be represented as [(AP1, d1); (AP2, d2); (AP3, d3)].

It should be noted that, in other optional embodiments, the wireless node may detect the distance between the terminal and the wireless node in the foregoing several manners. After obtaining the distance, the wireless node may send the distance to the server, or feedback the distance to the terminal.

It should be additionally noted that, there may be several variants and combinations in the present disclosure according to different calculation locations and different storage locations of navigation data. The foregoing possible implementations cannot be used to limit the present disclosure.

The following further describes the second type of location data of the point S.

The second type of location data of the point S is a sensor signal that is used to identify the point S and that can be collected by the terminal when the terminal is at the point S, where the sensor signal includes any one or more of a geomagnetic signal, a light signal, or a pneumatic signal.

Figure 5:
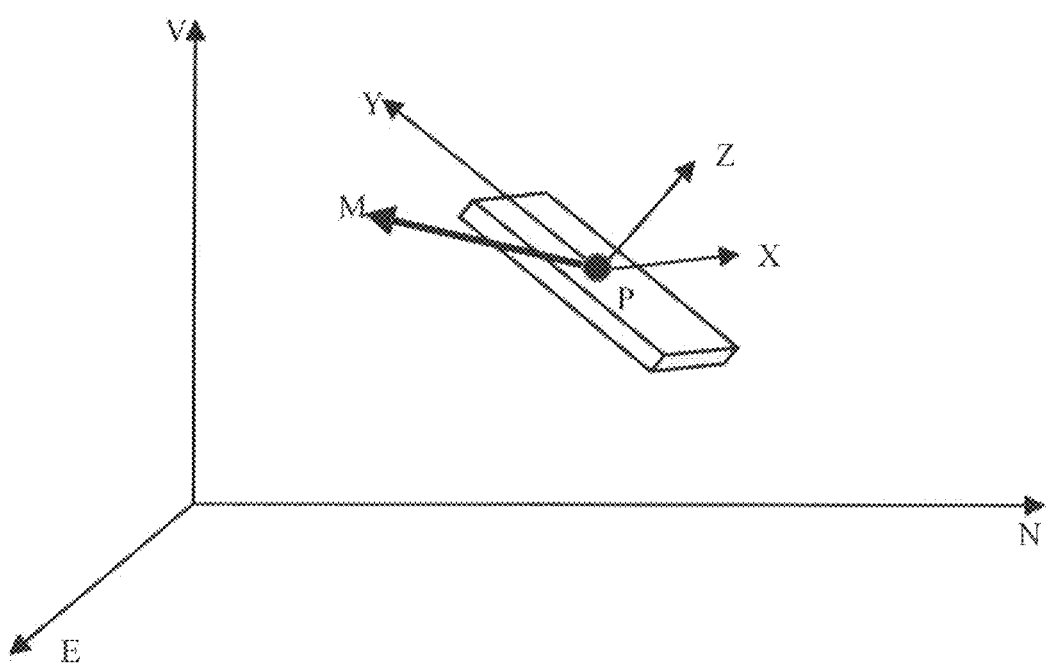
FIG. 5 is a schematic diagram of collecting a geomagnetic signal according to an embodiment of the present disclosure.

The terminal may detect the geomagnetic signal using a geomagnetic sensor. The geomagnetic signal may be determined according to a geomagnetic strength and an angle of a magnetic induction line relative to a terrestrial coordinate system. As shown in FIG. 5, it is assumed that a rectangular coordinate system (N, E, V) is a terrestrial coordinate system, N represents a direction of due north, E represents a direction of due east, V represents a vertical upward direction to which the center of the earth points, a magnetic induction line of the earth passes through an overhead point P, a magnetic field strength of the point is M. The strength value M may be obtained by calculating a total of strengths in directions of axes that are measured by a magnetic field sensor built in the terminal located at the point. In addition, an angle of the magnetic induction line, passing through the point, relative to the terrestrial coordinate system may be obtained by means of conversion according to an attitude angle of the terminal relative to the terrestrial coordinate system and output of the magnetic field sensor in directions of the axes.

The terminal may detect the pneumatic signal using a barometric pressure sensor, and detect the light signal using a light sensor or a camera. Assuming that the sensor signal is a geomagnetic signal and a pneumatic signal, the terminal may use the geomagnetic signal and the pneumatic signal that are detected at the point S as the location data of the point S.

The direction information of the location points in the navigation data is used to indicate moving directions in which the location points are passed through from a start point of the path to an end point of the path.

Optionally, the terminal may determine, by means of measurement using a gyroscope and an electronic compass, the moving directions in which the terminal passes through the location points, that is, tangent line directions of the location points in the path. Further, from the start point of the path to the end point of the path, a placing status of the terminal is kept unchanged. At the start point of the path, a starting direction of the path is determined using the electronic compass. Angles of deflection of the location points relative to the starting direction are determined using the gyroscope. The angles of deflection are used to indicate the moving directions in which the location points are passed through.

Optionally, the terminal may determine, by means of measurement using a gyroscope, an electronic compass, and a gravity sensor, the moving directions in which the location points are passed through. In this case, a placing status of the terminal does not need to be kept unchanged. A user only needs to carry the terminal, for example, places the terminal in a bag in order to determine, by means of measurement, the moving directions in which the terminal passes through the location points from the start point of the path to the end point of the path.

The sequence information of the location points in the navigation data is used to indicate a sequence in which the location points are passed through from the start point of the path to the end point of the path.

Optionally, the sequence information includes but is not limited to a sequence number, a time stamp, or a letter (such as A, B, C, and D). It should be noted that, any information that can be used to indicate a sequence may be applied to the present disclosure. The foregoing several implementations cannot be used to limit the present disclosure.

It should be noted that, regardless of a display manner of the sequence information, the sequence information of the location points from the start point of the path to the end point of the path is in ascending order or in descending order. That the sequence information is a sequence number is used as an example. Starting from the start point, sequence numbers corresponding to the location points are in ascending order or in descending order. It is assumed that there are five location points in total. If a sequence number of the start point is 1, sequence numbers of the location points after the start point may sequentially be 2, 3, 4, and 5 in ascending order, if a sequence number of the start point is 5, sequence numbers of the location points after the start point may sequentially be 4, 3, 2, and 1 in descending order. Other sequence information is by analogy with the foregoing description, and details are not elaborated.

Figure 1B:
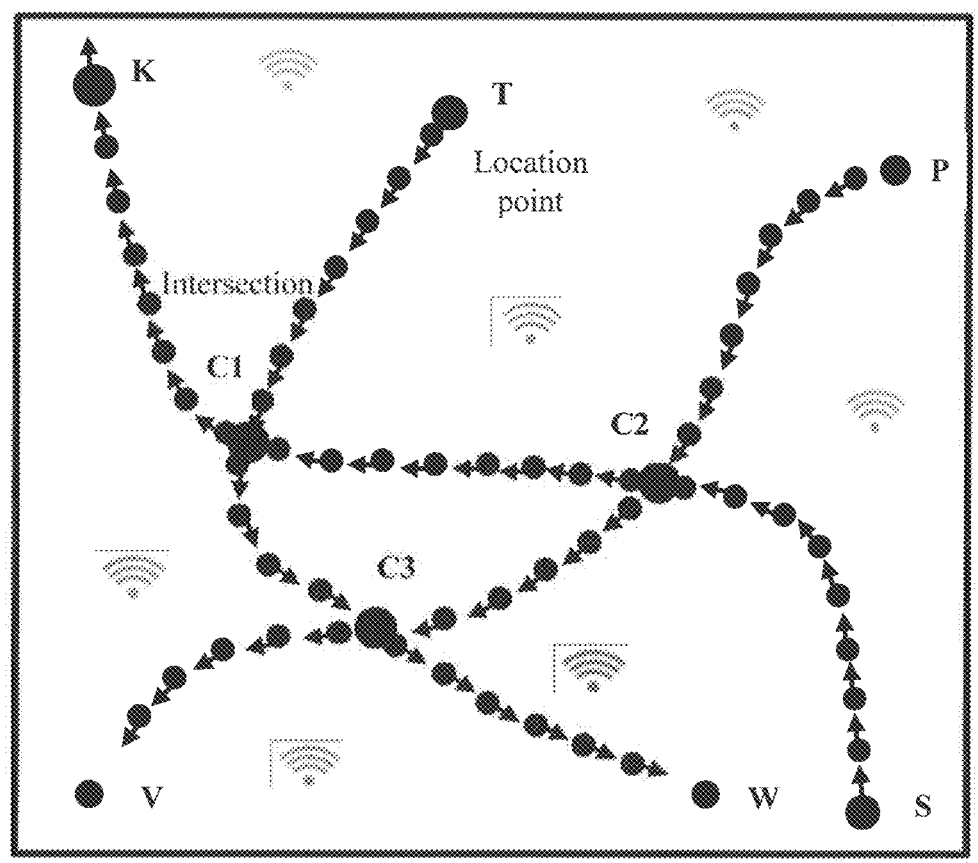
FIG. 1B is a schematic path navigation diagram in which multiple paths intersect with each other according to an embodiment of the present disclosure.

If there are at least two paths in the specific area, the at least two paths include K intersections, and K is greater than or equal to 1. As shown in FIG. 1B, the navigation data further includes at least path identifiers of location points.

The path identifiers of the location points are used to identify a path in which the location points are located.

Further, regardless of a quantity of paths in the specific area, the navigation data may further include an identifier corresponding to a location point. The identifier is a name of the location point, but not all of location points have an identifier. If detecting that a location point has an identifier, the terminal records the identifier as a part of navigation data.

The identifier of the location point may be entered by the user during navigation data collection. For example, when recording location data of a location point, the terminal may use a name entered by the user as an identifier of the location point. The identifier of the location point may be determined by the terminal according to a name of a wireless node. For example, when recording location data of a location point, the terminal obtains a name of a wireless node as an identifier of the location point if detecting that a received signal strength of the wireless node is relatively large.

Figure 1C:
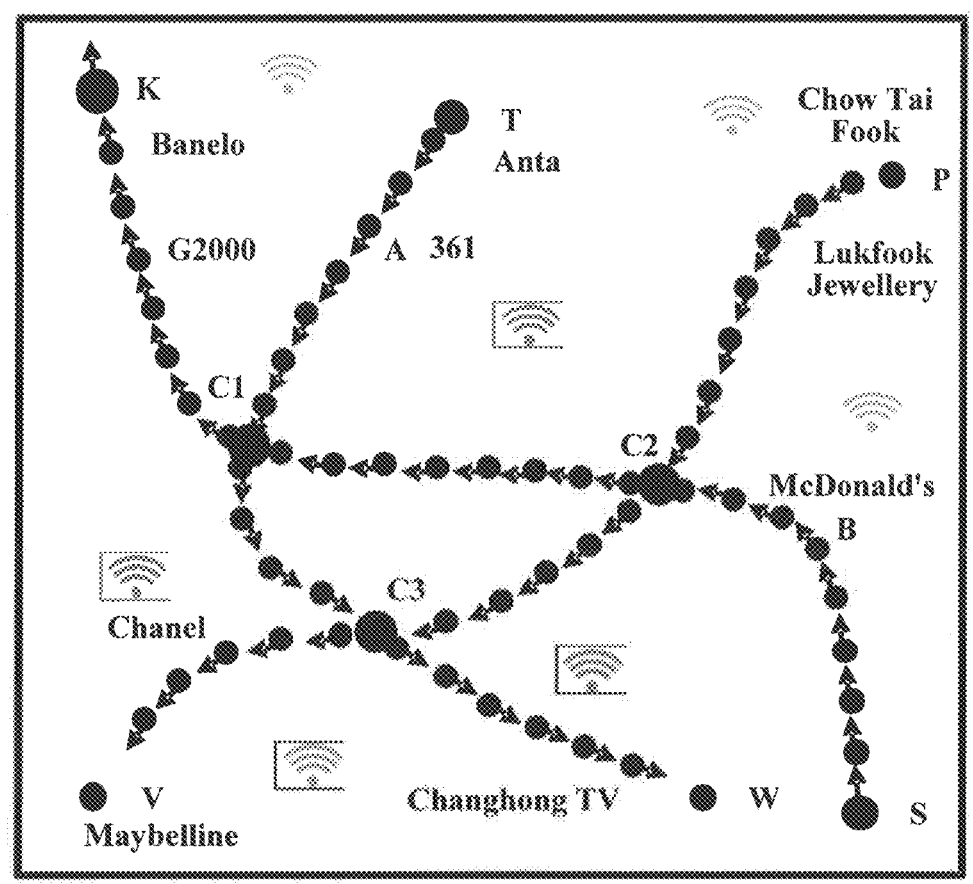
FIG. 1C is a schematic navigation diagram including identifiers of location points according to an embodiment of the present disclosure.

A schematic navigation diagram in which identifiers corresponding to location points are recorded may be shown in FIG. 1C, and navigation data corresponding to the location points may be listed in Table 1. It should be noted that, data units listed in Table 1 include path identifiers N, sequence information I, location data F, direction information A, and distance information L, which may be represented as (N, I, F, A, L).

TABLE 1

| Data unit | Identifier | Data unit | Identifier | Data unit | Identifier |
| --- | --- | --- | --- | --- | --- |
| 1, 1, $F_1(1)$, $A_1(1)$, $L_1(1)$ | Baleno | 2, 1, $F_2(1)$, $A_2(1)$, $L_2(1)$ | Anta | 3, 1, $F_3(1)$, $A_3(1)$, $L_3(1)$ | Chow Tai Fook |
| ... | | ... | | ... | |
| 1, 3, $F_1(3)$, $A_1(3)$, $L_1(3)$ | G2000 | 2, 5, $F_2(5)$, $A_2(5)$, $L_2(5)$ | 361 | ... | |
| ... | | ... | | 3, 9, $F_3(9)$, $A_3(9)$, $L_3(9)$ | Kinliufook |
| 1, 6, $F_1(6)$, $A_1(6)$, $L_1(6)$ | C1 | 2, 13, $F_2(13)$, $A_2(13)$, $L_2(13)$ | C1 | | |
| ... | | ... | | ... | |
| 1, 18, $F_1(18)$, $A_1(18)$, $L_1(18)$ | C2 | ... | | 3, 20, $F_3(20)$, $A_3(20)$, $L_3(20)$ | C2 |
| ... | | ... | | ... | |
| 1, 20, $F_1(20)$, $A_1(20)$, $L_1(20)$ | McDonald's | 2, 22, $F_2(22)$, $A_2(22)$, $L_2(22)$ | C3 | 3, 24, $F_3(24)$, $A_3(24)$, $L_3(24)$ | C3 |
| ... | | ... | | ... | |
| ... | | 2, 28, $F_2(28)$, $A_2(28)$, $L_2(28)$ | Changhong | 3, 27, $F_3(27)$, $A_3(27)$, $L_3(27)$ | Chanel |
| ... | | ... | | ... | |
| 1, 24, $F_1(24)$, $A_1(24)$, $L_1(24)$ | KFC | 2, 35, $F_2(35)$, $A_2(35)$, $L_2(35)$ | Konka | 3, 31, $F_3(31)$, $A_3(31)$, $L_3(31)$ | Maybelline |

The distance information L is used to indicate a distance between location points, and the distance information L may be a distance between any two adjacent location points of the location points. Further, a distance between two location points may be detected using an acceleration sensor inside the terminal. When recording navigation data of a current location point, the terminal also records distance information of the current location point. A previous location point of the current location point or the first location point in a current path may be used as a basis for recording the distance information of the current location point. Certainly, there may alternatively be other record manners. The present disclosure does not impose any limitation.

As shown in FIG. 1A, it is assumed that the terminal moves 1 meter from a point S along a path to reach a point A, and then moves 1.5 meters to reach a point B. When recording location data of the point A, the terminal also records a distance of the point A as 1 meter, when recording location data of the point B, the terminal also records the location data of the point B as 1.5 meters (that is, the previous location point A of the point B is used as a basis), or records the location data of the point B as 2.5 meters (that is, the first location point S in the current path is used as a basis).

A terminal that collects navigation data in a specific area has at least a wireless module and an electronic compass. The electronic compass is configured to determine a moving direction by means of measurement, and the wireless module is configured to collect location data. Further, the terminal may further include at least one of the following sensors, a light sensor, a barometric pressure sensor, or a geomagnetic sensor. The sensor and the wireless module jointly detect location data.

It should be noted that, in other optional embodiments, alternatively, a moving direction may be determined by means of measurement in other manners. For example, the moving direction is measured using a gyroscope and an electronic compass, or using a gyroscope, an electronic compass, and an acceleration sensor. Any technology that can be used to measure a moving direction may be applied to the present disclosure.

In an optional implementation, navigation data collected by the terminal may be stored in the terminal, and the terminal executes a navigation method in the embodiments of the present disclosure. In this case, the device for collecting the navigation data and the device for executing the navigation method are a same terminal. The terminal may be a terminal device such as a mobile phone, a tablet computer, a notebook computer, an ultra-mobile personal computer (UMPC), a netbook, or a personal digital assistant (PDA). In an embodiment of the present disclosure, that the terminal is a mobile phone is used as an example for description. A schematic structural diagram of the mobile phone may be shown in FIG. 6A.

Figure 6A:
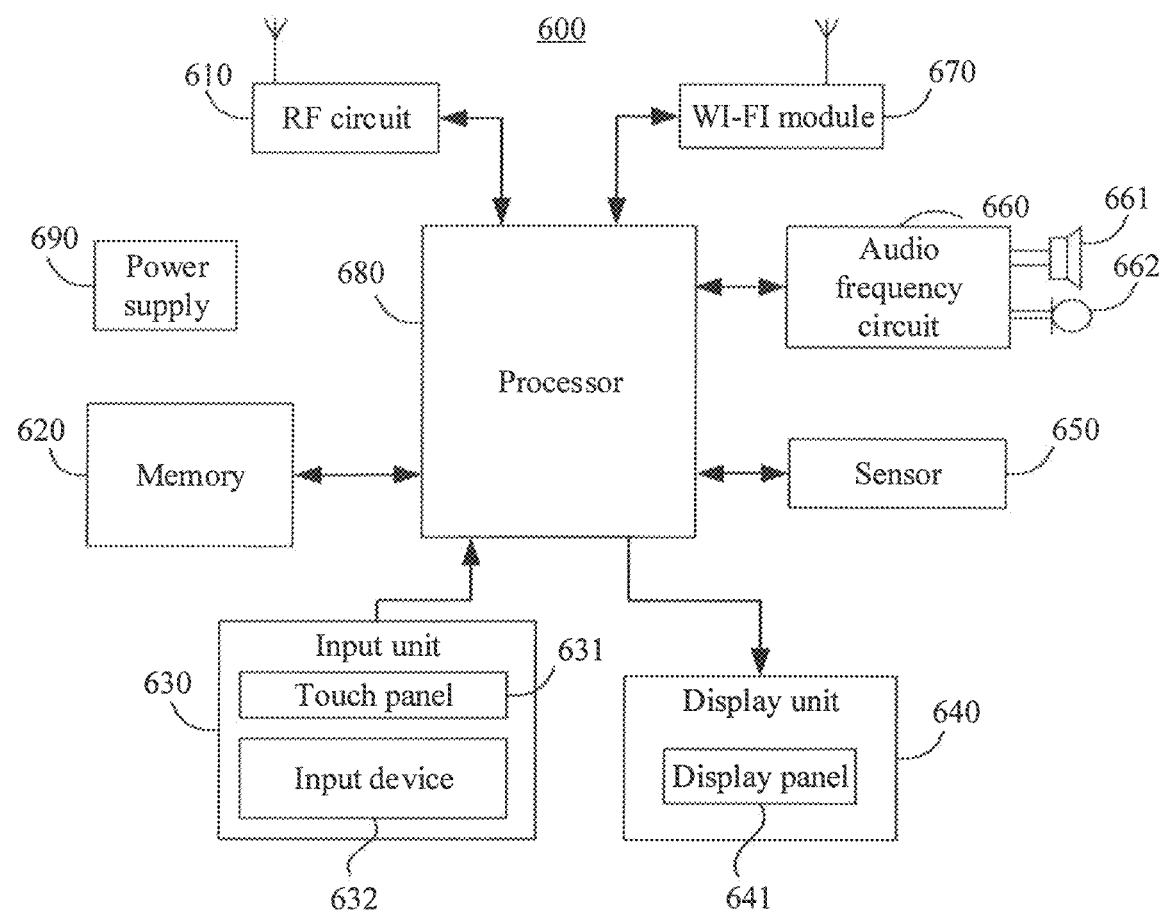
FIG. 6A is a schematic structural diagram of a navigation device according to an embodiment of the present disclosure.

As shown in FIG. 6A, the mobile phone 600 includes components such as a radio frequency (RF) circuit 610, a memory 620, an input unit 630, a display unit 640, at least one sensor 650, an audio frequency circuit 660, a WI-FI module 670, a processor 680, and a power supply 690. A person skilled in the art may understand that a structure of the mobile phone 600 shown in FIG. 6A does not constitute any limitation on the mobile phone, and the mobile phone may include more or fewer components than those shown in the figure, or a combination of some components, or the components disposed differently.

The following details each constituent part of the mobile phone 600 with reference to FIG. 6A.

The RF circuit 610 may be configured to receive and send a signal in an information receiving and sending process or a call process. It should be noted that, in other optional embodiments, if the terminal is a terminal device other than a mobile phone, such as a tablet computer or a notebook computer, the terminal may not include an RF circuit.

The memory 620 may be configured to store a software program and a module. The processor 680 executes various function and applications of the mobile phone 600 and data processing by running the software program and the module that are stored in the memory 620. The memory 620 may mainly include a program storage area and a data storage area. The program storage area may store an operating system, an application program required by at least one function (such as a voice playback function and an image playback function), and the like. If the mobile phone executes a navigation method in the embodiments of the present disclosure in an APP form, the application program further includes an application program for executing the navigation method. The data storage area may store data (such as audio data, image data, and navigation data) created according to use of the mobile phone 600, and the like. In addition, the memory 620 may include a high-speed random access memory (RAM), and may further include a non-volatile memory such as at least one magnetic disk memory, a flash memory device, or another volatile solid-state storage device.

The input unit 630 may be configured to receive input digital or character information and generate key signal input related to user setting and function control of the mobile phone 600. Further, the input unit 630 may include a touch panel 631 and an input device 632. The touch panel 631, also referred to as a touchscreen, may collect a touch operation (such as an operation performed by a user on the touch panel 631 or near the touch panel 631 using any proper object or accessory, such as a finger or a stylus) performed by the user on or near the touch panel 631, and drive a corresponding connection apparatus according to a preset program. Optionally, the touch panel 631 may include two parts a touch detection apparatus and a touch controller. The touch detection apparatus detects a touch direction of the user, detects a signal generated by a touch operation, and transmits the signal to the touch controller. The touch controller receives touch information from the touch detection apparatus, converts the touch information into contact coordinates, sends the contact coordinates to the processor 680, and can receive and execute a command sent by the processor 680. In addition, the touch panel 631 may be implemented using multiple types, such as a resistive type, a capacitive type, an infrared type, and a surface acoustic wave type. In addition to the touch panel 631, the input unit 630 may include the input device 632. Further, the input device 632 may include but is not limited to one or more of a physical keyboard, a function key (such as a volume control key or a power switch key), a trackball, a mouse, or a joystick.

The display unit 640 may be configured to display a navigation instruction. The display unit 640 may include a display panel 641. Optionally, the display panel 641 may be configured in a form of a liquid crystal display (LCD), an organic light-emitting diode (OLED), or the like. Further, the touch panel 631 may cover the display panel 641. After detecting a touch operation on or near the touch panel 631, the touch panel 631 transmits information about the touch operation to the processor 680 to determine a touch event type, and then the processor 680 provides corresponding visual output on the display panel 641 according to the touch event type. In FIG. 6A, the touch panel 631 and the display panel 641 are used as two independent components to implement input and output functions of the mobile phone 600. However, in some embodiments, the touch panel 631 and the display panel 641 may be integrated to implement the input and output functions of the mobile phone 600.

In the embodiments of the present disclosure, the at least one sensor 650 of the mobile phone may include an acceleration sensor, a gravity sensor, a gyroscope, an electronic compass, a geomagnetic sensor, a light sensor, or a barometric pressure sensor. The acceleration sensor may detect a moving distance, the gravity sensor, the gyroscope, and the electronic compass may detect a moving method, and the geomagnetic sensor, the light sensor, or the barometric pressure sensor may detect location data.

Certainly, the mobile phone 600 may further include other sensors such as a proximity sensor. The proximity light sensor may detect whether an object approaches or comes into contact with the mobile phone, and may turn off the display panel 641 and/or backlight when the mobile phone 600 moves closes to an ear. Other sensors that may be configured on the mobile phone 600 such as a barometer, a hygrometer, a thermometer, and an infrared sensor are not described herein.

The audio frequency circuit 660, a loudspeaker 661, and a microphone 662 may provide an audio interface between the user and the mobile phone 600. The audio frequency circuit 660 may transmit, to the loudspeaker 661, an electrical signal that is obtained after conversion of received audio data, and the loudspeaker 661 converts the electrical signal into a sound signal and outputs the sound signal. For example, if the navigation instruction output by the mobile phone is a voice instruction, the audio frequency circuit 660 outputs the navigation instruction using the loudspeaker 661.

The WI-FI module 670 is configured to detect location data. For a specific detection manner, reference may be made to the foregoing descriptions.

The processor 680 is a control center of the mobile phone 600, is connected to all the parts of the entire mobile phone using various interfaces and lines, and executes various functions of the mobile phone 600 and data processing by running or executing the software program and/or the module that are/is stored in the memory 620 and by invoking data stored in the memory 620 in order to perform overall monitoring on the mobile phone. For example, the processor 680 may further execute a navigation method shown in FIG. 9 or FIG. 12 according to the software program and/or the module that are/is stored in the memory 620. Optionally, the processor 680 may include one or more processing units. Preferably, an application processor and a modem processor may be integrated into the processor 680. The application processor mainly processes an operating system, a user interface, an application program, and the like, and the modem processor mainly processes wireless communication. It can be understood that the modem processor may alternatively not be integrated into the processor 680.

The mobile phone 600 further includes the power supply 690 (such as a battery) that supplies power to all the components. Preferably, the power supply may be logically connected to the processor 680 using a power management system such that functions such as charging and discharging management and power consumption management are implemented using the power management system.

Although not shown, the mobile phone 600 may further include a BLUETOOTH module, a near field communication (NFC) module, and the like. Details are not described herein.

Figure 9:
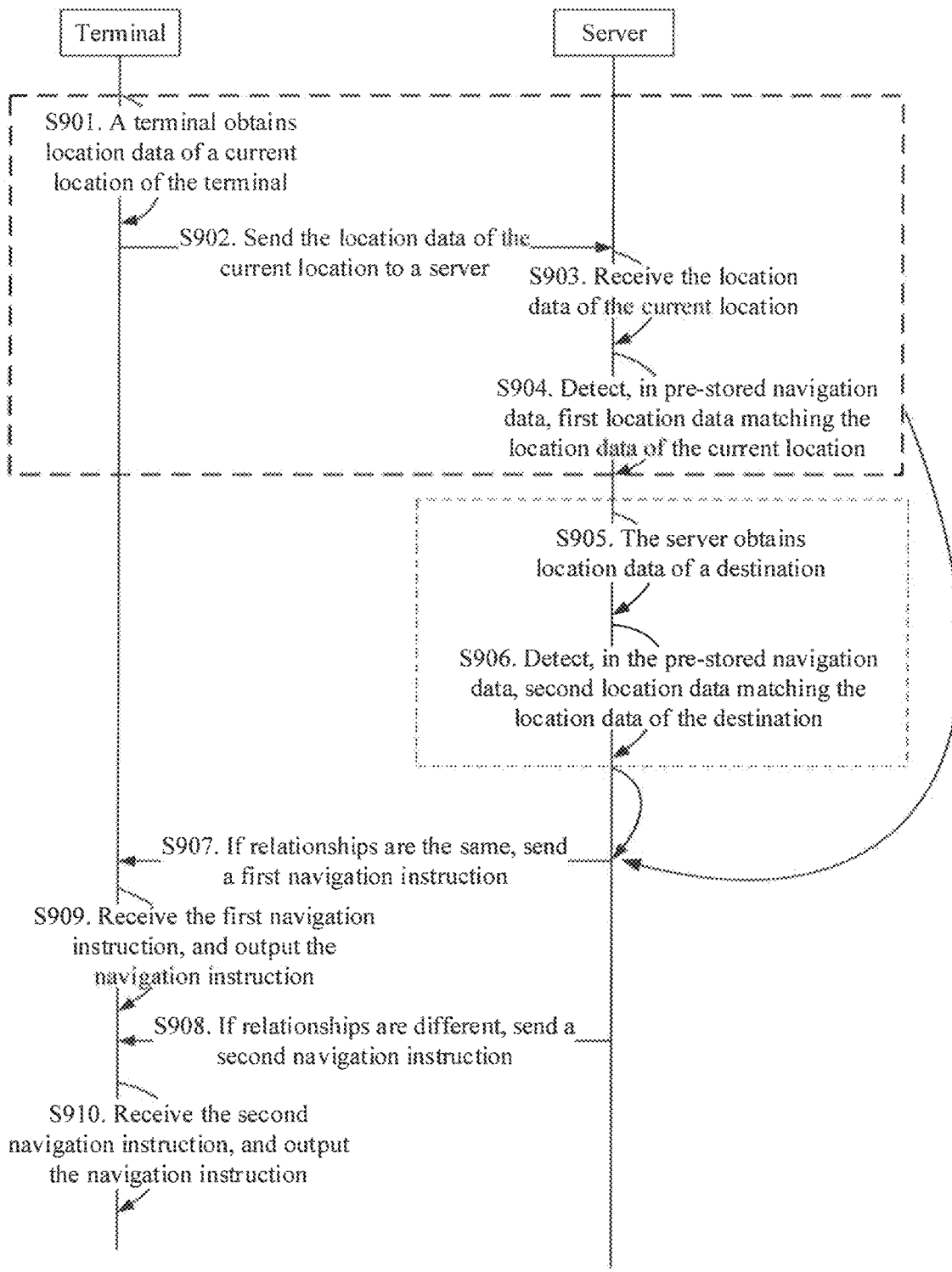
FIG. 9 is a schematic flowchart of a navigation method according to an embodiment of the present disclosure.
Figure 12:
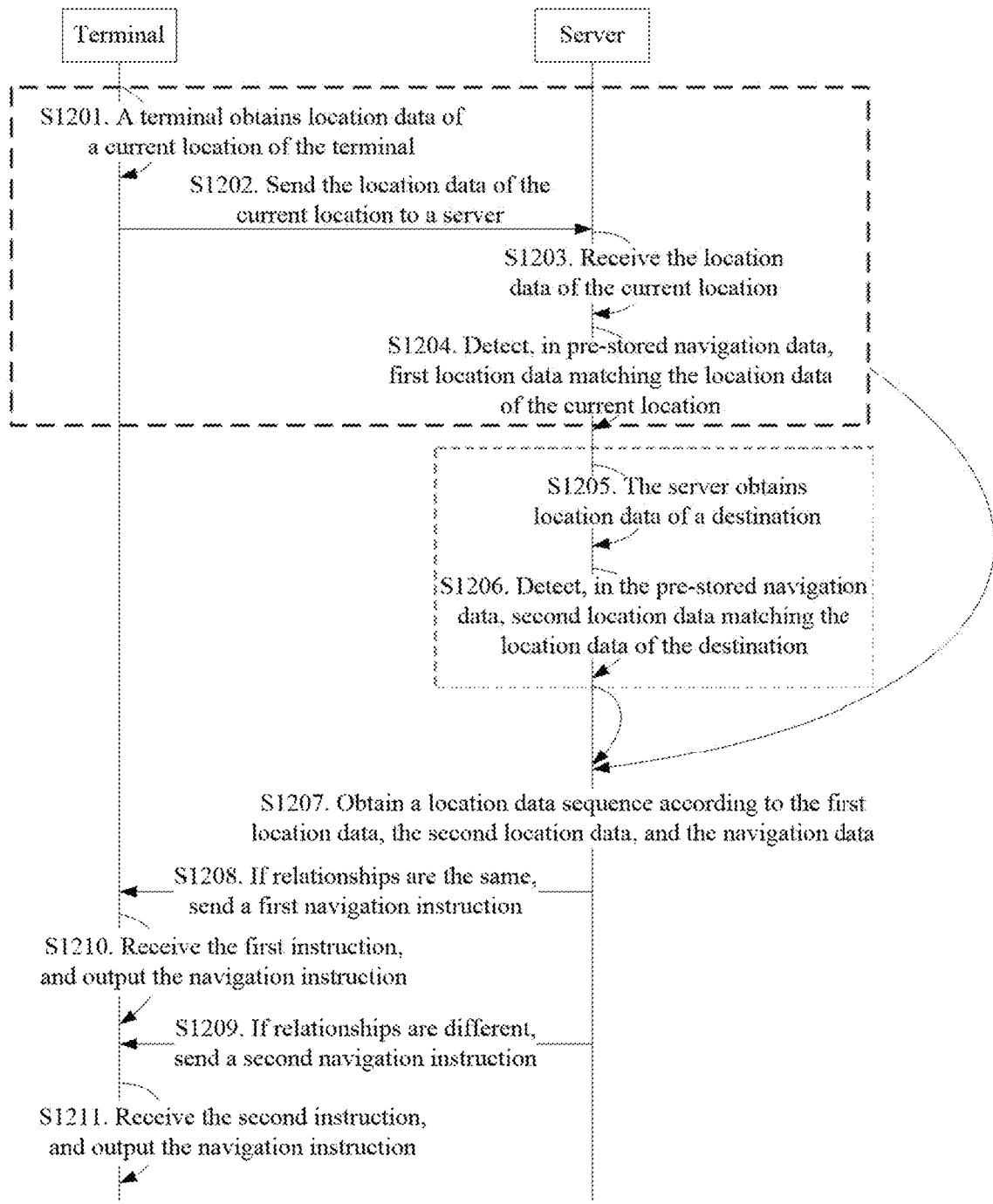
FIG. 12 is a schematic flowchart of another navigation method according to an embodiment of the present disclosure.

Further, the processor 680 may execute the navigation method shown in FIG. 9 or FIG. 12 according to the program code stored in the memory 620. For details, reference may be made to a description in FIG. 9 or FIG. 12. Details are not described herein.

If navigation data collected by the terminal is stored in the terminal, the navigation method in the embodiments of the present disclosure may be executed at different layers of the terminal. The navigation method may be implemented in an APP form, or may be implemented at an operating system (OS) layer or a hardware layer of the terminal. The following separately provides descriptions.

First Type: Implementation in an APP Form

Figure 6B:
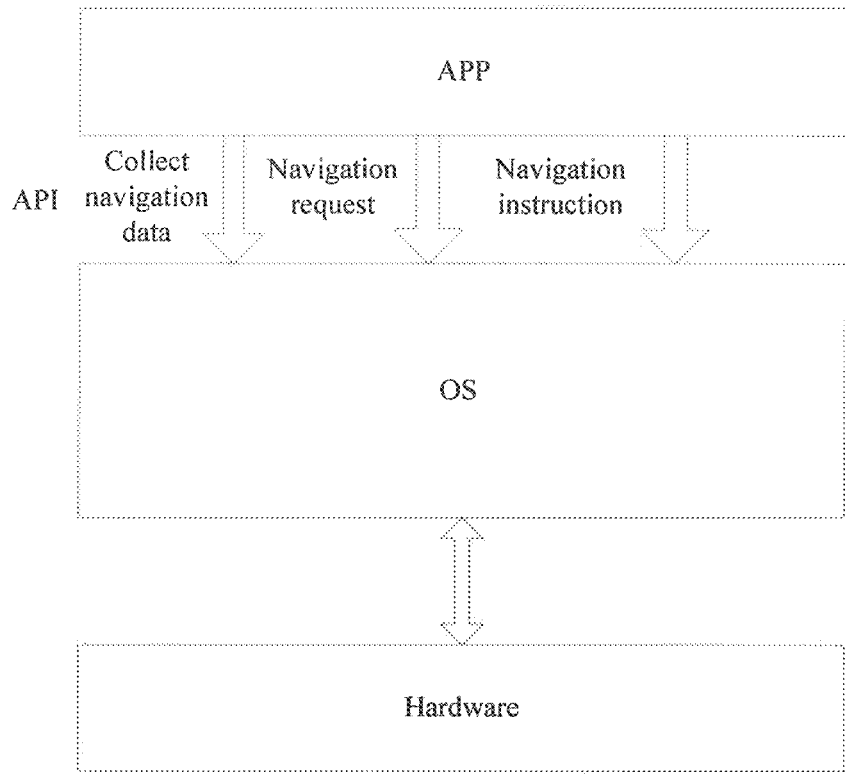
FIG. 6B is a schematic diagram of a terminal implementing a navigation method in an application (also referred to as APP) form according to an embodiment of the present disclosure.

As shown in FIG. 6B, an OS provides an API interface such that an APP invokes hardware to execute the navigation method in the embodiments of the present disclosure.

Further, during navigation data collection, the API interface is used to invoke the hardware to collect the navigation data. For example, the API interface for collecting navigation data is used to invoke a WI-FI module and a geomagnetic sensor to collect location data. For another example, the API interface for collecting navigation data is used to invoke a gyroscope, an electronic compass, and a gravity sensor to collect a moving direction. The collected navigation data needs to be fed back to the APP using the API interface. During navigation, the APP invokes the hardware using the API interface to obtain location data of a current location, and feeds back the location data of the current location to the APP using the API interface, and the APP performs location data matching, and outputs a navigation instruction using the API interface. For example, the API interface is used to invoke a screen to display a navigation instruction, or the API interface is used to invoke a loudspeaker to play a navigation instruction in a voice form.

In conclusion, during implementation in the APP form, a used-for-navigation APP needs to be first installed. Collected navigation data is stored at the APP layer, and various types of calculation are also implemented at the APP layer, such as calculation of location data and a moving direction. The OS only provides the API interface such that the APP invokes the hardware to implement the navigation method in the embodiments of the present disclosure.

Second Type: Implementation at an OS Layer of the Terminal

Figure 6C:
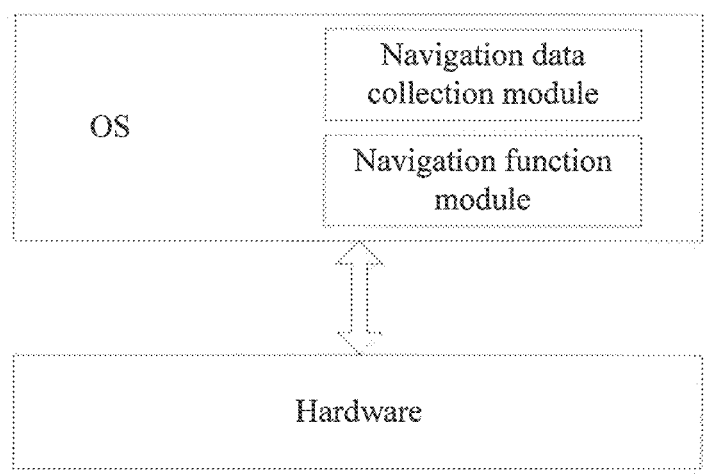
FIG. 6C is a schematic diagram of a terminal implementing a navigation method at an OS layer according to an embodiment of the present disclosure.

As shown in FIG. 6C, a navigation function module and a navigation data collection module is integrated into the OS in advance, and the terminal executes the navigation method in the embodiments of the present disclosure by calling functions corresponding to the navigation function module and the navigation data collection module. Further, the OS may further provide an API interface for the navigation function module and the navigation data collection module. A third party application may use the API interface to call the function corresponding to the navigation function module or the navigation data collection module, to execute the navigation method in the embodiments of the present disclosure.

For example, the third party application uses the API interface to call the function corresponding to the navigation function module or the navigation data collection module to execute the navigation method in the embodiments of the present disclosure. Further, during navigation data collection, the third party application uses the API interface to call the function corresponding to the navigation data collection module at the OS layer to collect navigation data, and stores the collected navigation data at the OS layer. During navigation, the third party application uses the API interface to call the function corresponding to the navigation function module at the OS layer to obtain location data of a current location, performs location data matching, and outputs a navigation instruction using hardware. For example, a navigation instruction is displayed using a screen, or a navigation instruction is played in a voice form using a loudspeaker. It should be noted that, a person of ordinary skill in the art can understand a manner of invoking, using a function corresponding to the OS layer, corresponding hardware to implement a function corresponding to the function. Details are not described herein.

In conclusion, during implementation at the OS layer of the terminal, there are two cases. A first case includes that the terminal itself has a navigation function, and a used-for-navigation APP may not be installed. A second case includes that a used-for-navigation APP is installed in the terminal, and the terminal provides, using the OS layer, the API interface to call the corresponding function to execute the navigation method in the embodiments of the present disclosure. Collected navigation data is stored at the OS layer, and various types of calculation are also implemented at the OS layer, such as calculation of location data and a moving direction.

Third Type: Implementation at a Hardware Layer of the Terminal

Figure 6D:
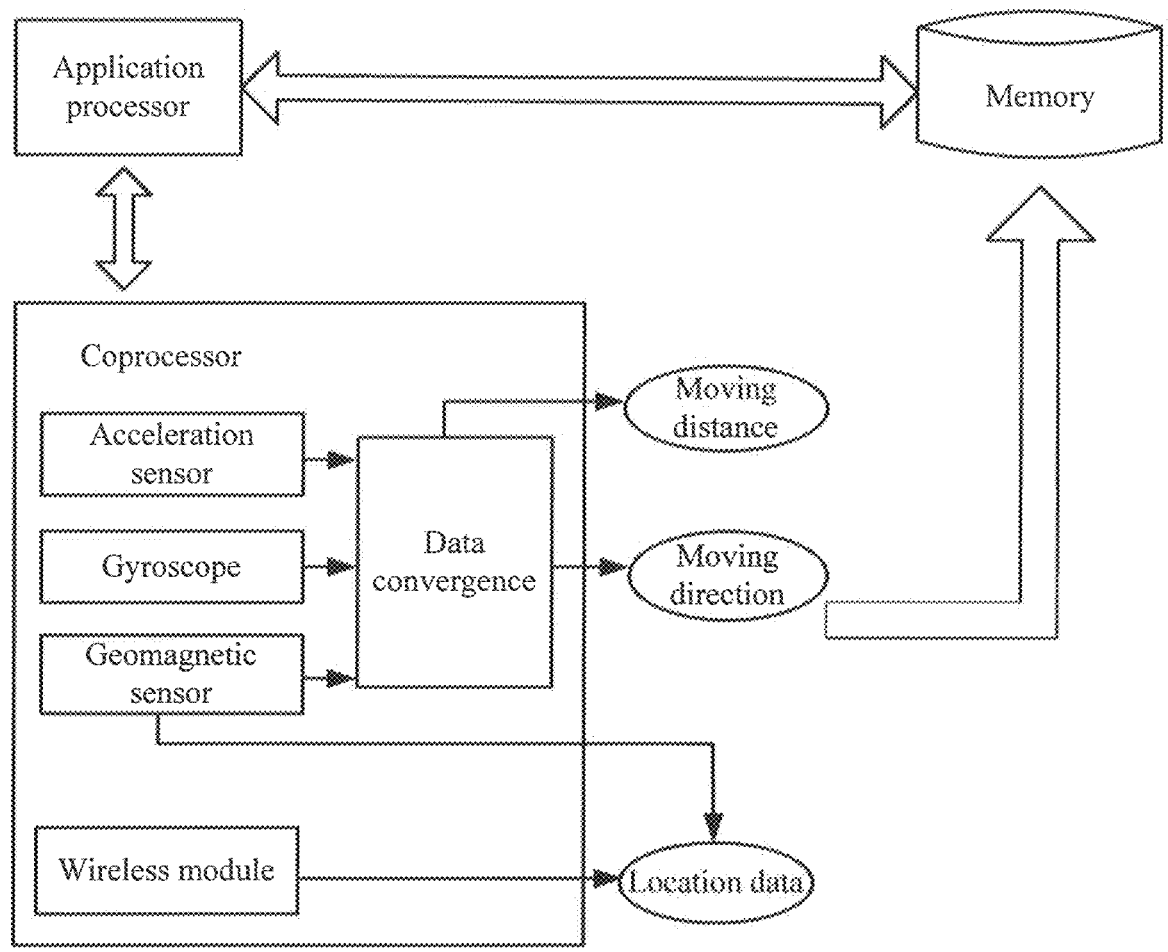
FIG. 6D is a schematic diagram of a terminal implementing a navigation method at a hardware layer according to an embodiment of the present disclosure.

Navigation hardware such as a WI-FI module, a gyroscope, an electronic compass, and various sensors may be integrated into the hardware layer. The memory stores navigation data and the program code that is used to execute the embodiments of the present disclosure. The application processor calls the code stored in the memory, to execute the navigation method. To reduce power consumption, a chip may be installed at the hardware layer. Navigation hardware and a coprocessor (for example, a sensor hub) is integrated into the chip. In this way, the coprocessor may be used for performing operations such as navigation data collection and location data matching, as shown in FIG. 6D. That is, when the user carries the terminal in a pocket or holds the terminal in a hand casually without watching a screen, and when the application processor is hibernated, the coprocessor alone may be responsible for operations of collecting and recoding location data, a moving direction, and a moving distance in order to help to reduce power consumption of the terminal.

Figure 7A:
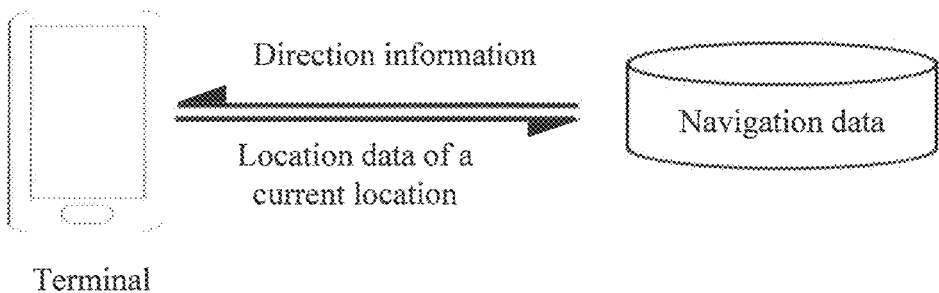
FIG. 7A is a schematic diagram of navigation cooperatively executed by a terminal and a server according to an embodiment of the present disclosure.

In another optional implementation, the terminal may send navigation data to a server, and the server and the terminal cooperatively execute the navigation method according to the embodiments of the present disclosure. For example, the server executes both location data matching and path calculation, and the terminal only sends data of a current location to the server and receives an instruction from the server, as shown in FIG. 7A.

Figure 7B:
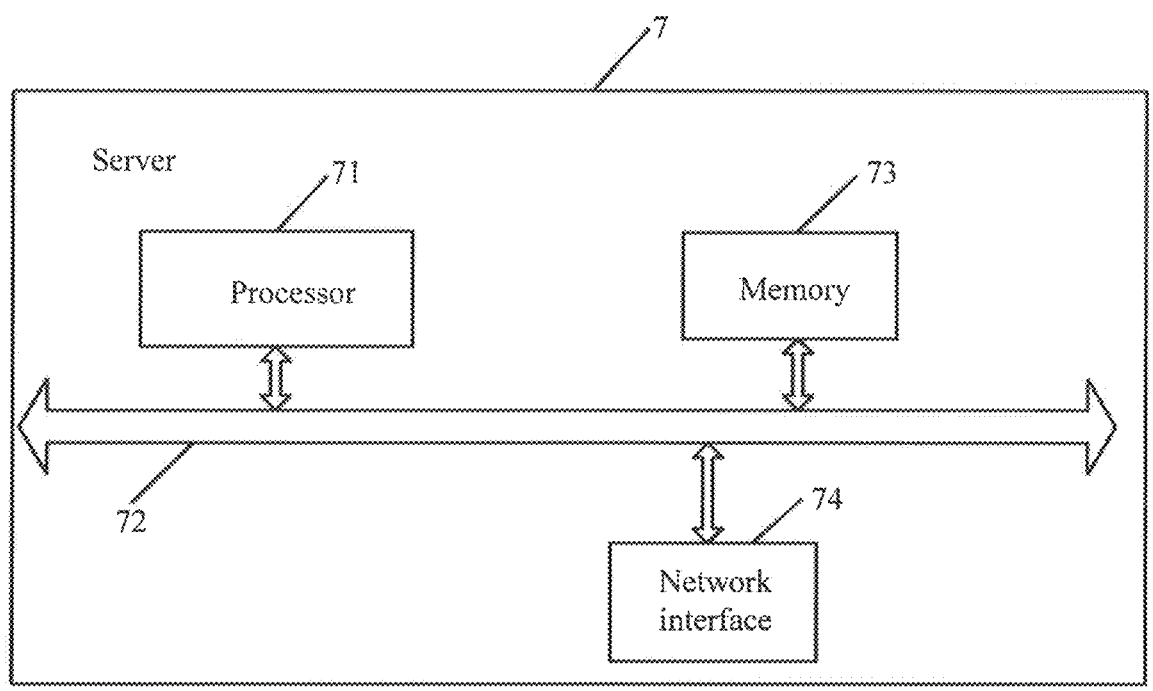
FIG. 7B is a schematic structural diagram of a server according to an embodiment of the present disclosure.

In this case, a device for executing the navigation method is the server. As shown in FIG. 7B, the server 7 may include at least one processor 71, at least one communications bus 72, a memory 73, and a network interface 74. The network interface 74 is configured to receive navigation data and location data of a current location, and output a navigation instruction to the terminal. The communications bus 72 is configured to implement connection and communication between these components. The memory 73 may be a high-speed RAM memory, or may be a non-volatile memory, for example, at least one magnetic disk memory. Optionally, the memory 73 may alternatively be at least one storage apparatus located far away from the processor 71. The processor 71 may execute the navigation method shown in FIG. 9 or FIG. 12 according to program code stored in the memory 73.

Figure 8:
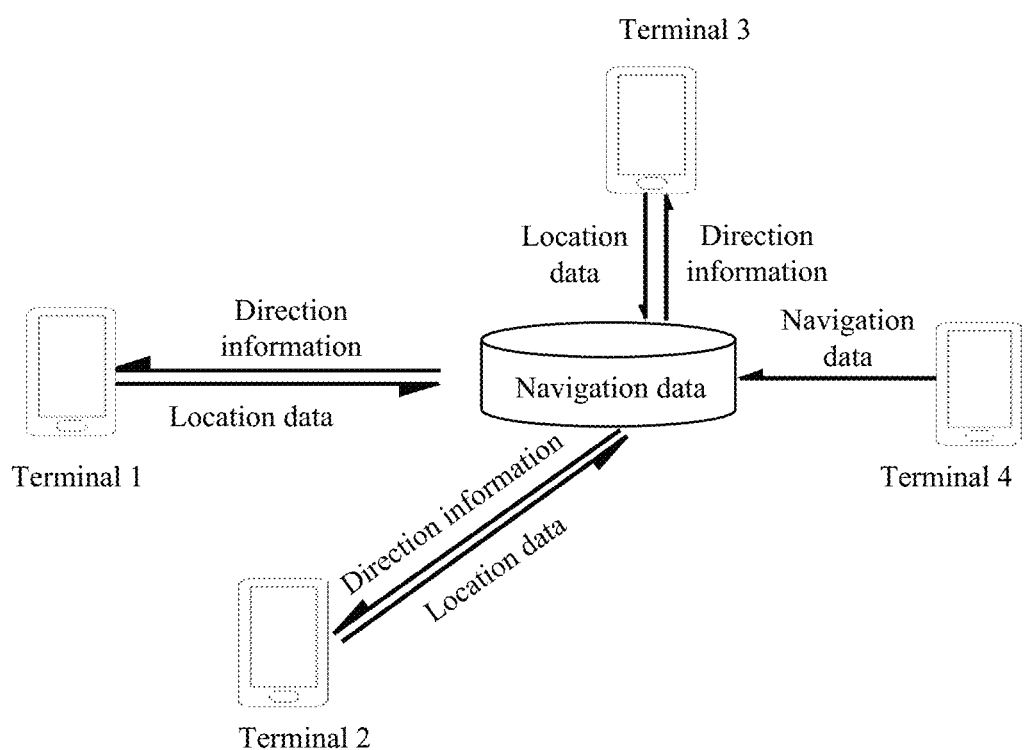
FIG. 8 is a schematic diagram of navigation cooperatively executed by a terminal and a server according to another embodiment of the present disclosure.

In still another optional implementation, at least two terminals and the server cooperatively execute the navigation method according to the embodiments of the present disclosure. As shown in FIG. 8, the method may include a first terminal (e.g. a terminal 4 in FIG. 8) sends collected navigation data to the server, other terminals (at least one terminal, one or more of terminals 1, 2, and 3 in FIG. 8) report location data of a current location to the server. The server executes location data matching and path calculation, and then sends a navigation instruction to the corresponding terminals.

In this case, a device for executing the navigation method is the server. For a schematic structural diagram of the server, reference may be made to FIG. 7. Details are not described herein again.

The following details, using an example of cooperative execution of the server and the terminal (that is, using FIG. 7A as an example) and with reference to FIG. 9 and FIG. 12, the navigation method according to the embodiments of the present disclosure.

Referring to FIG. 9, FIG. 9 is a schematic flowchart of a navigation method according to an embodiment of the present disclosure. This embodiment of the present disclosure is implemented in a case in which there is only one path or there are at least two paths without any intersection in a specific area. As shown in FIG. 9, the method may include the following steps.

Step S901. A terminal obtains location data of a current location of the terminal.

It should be noted that, for a manner of obtaining, by the terminal, location data of a current location of the terminal, reference may be made to the foregoing description of navigation data collection. Details are not described herein again.

Step S902. The terminal sends the location data of the current location obtained by the terminal to a server.

Step S903. The server receives the location data of the current location sent by the terminal.

Step S904. The server detects, in pre-stored navigation data, first location data matching the location data of the current location.

If location data that is the same as or similar to the location data of the current location is detected by the server in the pre-stored navigation data, the server uses the detected location data as the first location data. If location data is detected by the server in the navigation data according to a preset matching rule and a degree of match between the detected location data and the location data of the current location reaches a preset matching threshold, the server determines that similar location data is detected.

It is assumed that the preset matching rule includes matching is first performed on names of wireless nodes, if all the names of the wireless nodes are the same, matching is performed on received signal strengths, and if a difference between a received signal strength of location data in navigation data and a strength of a received signal, sent by a wireless node, corresponding to the current location is within a preset threshold, the navigation data is used as the location data that is similar to the location data of the current location. For example, location data of a current location is [(AP1, RSSI1); (AP2, RSSI2); (AP3, RSSI3)], and there is location data M [(AP1, RSSI1); (AP2, RSSI2); (AP3, RSSI3)] in pre-stored navigation data. If a difference between the RSSI1 and the RSSI1, a difference between the RSSI2 and the RSSI2, and a difference between the RSSI3 and the RSSI3 are all within the preset threshold, the location data M is used as the location data that is similar to the location data of the current location.

It should be noted that, the preset matching rule, the preset matching threshold, and the preset threshold may be adjusted according to actual requirements. The present disclosure does not impose any limitation.

It should be additionally noted that, there may be more combinations and variants for the preset matching rule. The foregoing specific implementation cannot be used to limit the present disclosure.

Step S905. The server obtains location data of a destination.

In an optional implementation, the server may receive location data of the destination sent by another device. The other device may be another terminal, an anti-loss tag, a watch having a positioning function, or the like. The other device sends navigation data of each location point in a moving track to the server, and the server may use location data that is uploaded by the other device last time (that is, a latest time) as the location data of the destination.

The other device and the terminal are in an association relationship, which may be pairing implemented in advance or may indicate that the terminal designates the other device as a to-be-searched-for device.

In another optional implementation, the server uses previously obtained location data of a location point as the location data of the destination. A path includes M location points. The server may use previously recorded location data of any location point in the path as the location data of the destination. Preferably, recorded location data of the first location point in the path is used as the location data of the destination. That a user parks a car is used as an example. After the user parks the car, the user may enable a terminal to record location data. The terminal may record navigation data of location points in a moving track formed during a process from parking at a parking location to leaving a parking lot, and upload the navigation data of the location points to the server. When entering the parking lot to search for the car, the user uses previously recorded location data of a location point in the moving track as the location data of the destination. Preferably, recorded location data of the first location point (that is, closest to the actual parking location of the user) in the moving track is used as the location data of the destination such that the user can find the parking location more quickly.

In still another optional implementation, the navigation data may further include an identifier of a location point. The server obtains an identifier, entered by a user on the terminal, of the destination, and obtains, from the pre-stored navigation data, the location data of the destination that is corresponding to the identifier of the destination.

It should be noted that, an execution sequence of steps S901 and S905 is not limited in this embodiment of the present disclosure. Step S901 may be performed first, step S905 may be performed first, or steps S901 and S905 are performed at the same time.

Step S906. The server detects, in the pre-stored navigation data, second location data matching the location data of the destination.

If location data that is the same as or similar to the location data of the destination is detected by the server in the pre-stored navigation data, the server uses the detected location data as the second location data.

Step S907. The server sends a first navigation instruction to the terminal if a relationship between the first location data and the second location data is the same as a preset relationship between a current location and a destination. The first navigation instruction is used to instruct a user to move in a first direction, and a second direction is a direction corresponding to the first location data.

In the pre-stored navigation data, if sequence information of location points from a start point of the path to an end point of the path is in ascending order, and sequence information corresponding to the first location data is less than sequence information corresponding to the second location data, it indicates that a moving direction of the terminal in the path is the same as a moving direction that is during navigation data collection. In this case, the terminal should move in the direction corresponding to the first location data, and output the first navigation instruction. FIG. 1A is used as an example. It is assumed that during navigation data collection, a moving direction is SK, and recorded sequence information of location points is in ascending order. For example, sequence information of a point S, a point A, a point B, and a point K is 1, 6, 18, and 24, respectively. During navigation, if sequence information, corresponding to a current location of the terminal, of a location point is 1, and sequence information, corresponding to a destination, of a location point is 18, it may be determined that a direction in which the terminal needs to move is the same as the moving direction that is during navigation data collection. Therefore, the terminal moves in the moving direction corresponding to the location data of the location points.

In the pre-stored navigation data, if sequence information of location points from a start point of the path to an end point of the path is in descending order, and sequence information corresponding to the first location data is greater than sequence information corresponding to the second location data, it indicates that a moving direction of the terminal in the path is the same as a moving direction that is during navigation data collection. In this case, the terminal should move in the direction corresponding to the first location data, and output the first navigation instruction. FIG. 1A is used as an example. It is assumed that during navigation data collection, a moving direction is SK, and recorded sequence information of location points is in descending order. For example, sequence information of a point S, a point A, a point B, and a point K is 24, 19, 7, and 1, respectively. During navigation, if sequence information, corresponding to a current location of the terminal, of a location point is 20, and sequence information, corresponding to a destination, of a location point is 2, it may be determined that a direction in which the terminal needs to move is the same as the moving direction that is during navigation data collection. Therefore, the terminal moves in the moving direction corresponding to the location data of the location points.

Step S908. The server sends a second navigation instruction to the terminal if a relationship between the first location data and the second location data is opposite to a preset relationship between a current location and a destination. The second navigation instruction is used to instruct a user to move in a second direction, and the second direction is a direction obtained after the first direction rotates 180°.

In the pre-stored navigation data, if sequence information of location points from a start point of the path to an end point of the path is in ascending order, and sequence information corresponding to the first location data is greater than sequence information corresponding to the second location data, it indicates that a moving direction of the terminal in the path is opposite to a moving direction that is during navigation data collection. In this case, the terminal should move in a direction obtained after the direction corresponding to the first location data rotates 180°, and output the second navigation instruction. FIG. 1A is used as an example. It is assumed that during navigation data collection, a moving direction is SK, and recorded sequence information of location points is in ascending order. For example, sequence information of a point S, a point A, a point B, and a point K is 1, 6, 18, and 24, respectively. During navigation, if sequence information, corresponding to a current location of the terminal, of a location point is 20, and sequence information, corresponding to a destination, of a location point is 2, it may be determined that a direction in which the terminal needs to move is opposite to the moving direction that is during navigation data collection. Therefore, the terminal moves in the direction obtained after the moving direction corresponding to the location data of the location points rotates 180°.

In the pre-stored navigation data, if sequence information of location points from a start point of the path to an end point of the path is in descending order, and sequence information corresponding to the first location data is less than sequence information corresponding to the second location data, it indicates that a moving direction of the terminal in the path is opposite to a moving direction that is during navigation data collection. In this case, the terminal should move in a direction obtained after the direction corresponding to the first location data rotates 180°, and output the second navigation instruction. FIG. 1A is used as an example. It is assumed that during navigation data collection, a moving direction is SK, and recorded sequence information of location points is in descending order. For example, sequence information of a point S, a point A, a point B, and a point K is 24, 19, 7, and 1, respectively. During navigation, if sequence information, corresponding to a current location of the terminal, of a location point is 1, and sequence information, corresponding to a destination, of a location point is 18, it may be determined that a direction in which the terminal needs to move is opposite to the moving direction that is during navigation data collection. Therefore, the terminal moves in the direction obtained after the moving direction corresponding to the location data of the location points rotates 180°.

Further, if a difference between sequence information corresponding to the first location data and sequence information corresponding to the second location data is less than or equal to a preset threshold, an indication that a destination is reached is output. That sequence information is a time stamp is used as an example. It is assumed that the preset threshold is 5 seconds (s). If a difference between a time stamp corresponding to the first location data and a time stamp corresponding to the second location data is within 5 s, it indicates that a user has reached a destination. In this case, the server outputs, to the terminal, an indication that the destination is reached.

In another case, if the first location data is the same as the second location data, it indicates that a user has reached a destination. In this case, the server outputs, to the terminal, an indication that the destination is reached.

It should be noted that, the preset threshold may be set by the server, may be set by the user, or may be adjusted according to actual requirements. This embodiment of the present disclosure does not impose any limitation.

Step S909. The terminal receives the first navigation instruction sent by the server, and outputs the navigation instruction.

The terminal may output the navigation instruction in a form such as graphics, a text, or a voice. If the navigation instruction is output in a graphics form, optionally, the terminal may indicate a moving direction using an arrow. It should be noted that, the moving direction is an actual moving direction of a user, and is unrelated to an orientation of the terminal. For example, if an indicated moving direction is a direction of due north, regardless of a current orientation of the terminal, displayed graphics, a displayed text, and a displayed voice all point to the direction of due north.

Step S910. The terminal receives the second navigation instruction sent by the server, and outputs the navigation instruction.

After receiving the navigation instruction sent by the server, the terminal may be carried by the user to a next location, obtain location data of the next location of the terminal, and send the location data of the next location to the server. If the server finds that in the pre-stored navigation data, there is no location data matching the location data of the next location, it indicates that the user has deviated from an original path currently. In this case, any one of the following manners may be used to help the user to return to the original path.

Figure 10:
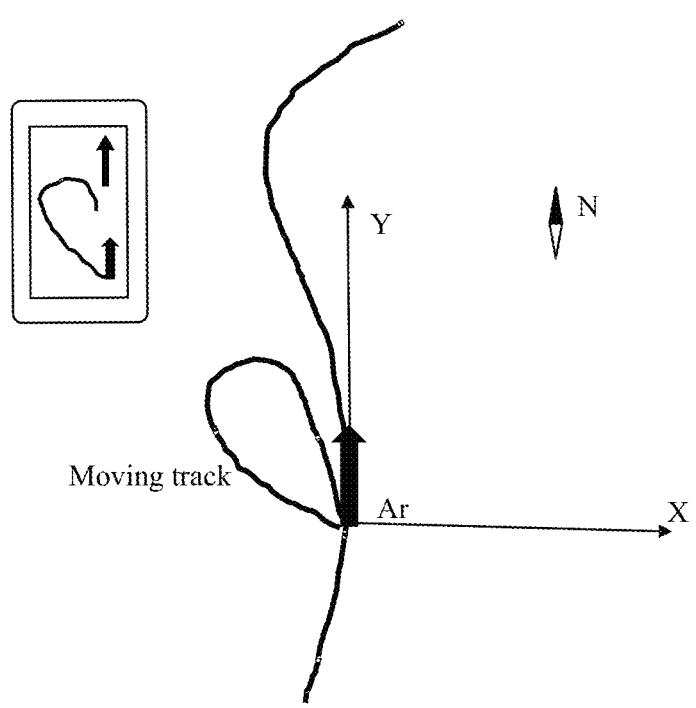
FIG. 10 is a schematic diagram of navigation performed after deviation from an original path occurs according to an embodiment of the present disclosure.

Manner 1: When finding that the user has deviated from the original path, the server starts to obtain a moving track of the terminal, and outputs a third navigation instruction according to the obtained moving track of the terminal. The third navigation instruction is used to instruct the user to return to a previous location of the next location, and the pre-stored navigation data includes location data matching location data of the previous location of the next location. As shown in FIG. 10, when finding that the user has deviated from the original path, the server obtains deviation duration, a deviation speed (that is, a walking speed of the user), and a navigation direction that are during deviation. The server determines a moving track generated during deviation according to the obtained deviation duration, deviation speed, and navigation direction that are during deviation. The server outputs the third navigation instruction to the terminal according to the moving track in order to help the user to return to the original path.

During a period of returning to the original path according to the third navigation instruction, if the server detects that in the pre-stored navigation data, there is location data matching data of a current location, it indicates that the user has returned to another location point in the original path. A corresponding navigation instruction is provided according to the location data of the location point.

Figure 11:
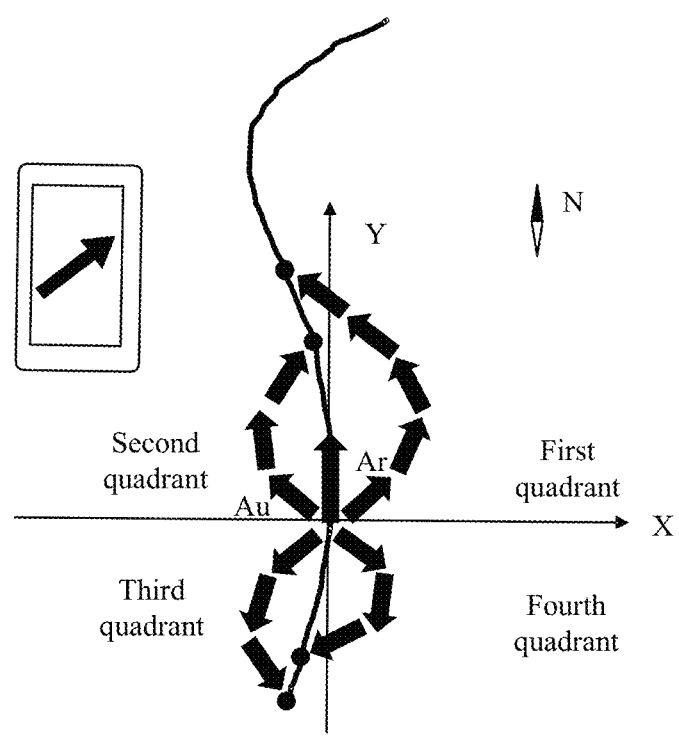
FIG. 11 is another schematic diagram of navigation performed after deviation from an original path occurs according to an embodiment of the present disclosure.

Manner 2: When finding that the user has deviated from the original path, the server outputs a fourth navigation instruction according to a moving direction of the terminal when the location data of the next location is obtained and direction information of a previous location of the next location, where the fourth navigation instruction is used to instruct the user to return to the first path, and the pre-stored navigation data includes location data matching location data of the previous location of the next location and corresponding direction information. As shown in FIG. 11, when finding that the user has deviated from the original path, the server obtains a moving direction Au of the terminal during deviation and direction information Ar of a previous location of the next location. If a clockwise angle from Ar to Au is 90° to 180°, or 270° to 360°, the user is guided to walk ahead to the left, otherwise, the user is guided to walk ahead to the right, until the user returns to the original path.

It should be noted that, in the embodiment shown in FIG. 9, all steps performed by the server may alternatively be performed by the terminal. Details are not described herein again.

In the embodiment shown in FIG. 9, the first location data matching the location data of the current location and the second location data matching the location data of the destination are obtained by means of matching by the server using the pre-stored navigation data, and a navigation instruction is output to the terminal according to the relationship between the first location data and the second location data and the preset relationship between a current location and a destination. In this way, a navigation function can be implemented in the specific area without a map and positioning.

It should be noted that, that there is no need for positioning in this embodiment means that information about a latitude and a longitude of the terminal does not need to be obtained by means of positioning.

Referring to FIG. 12, FIG. 12 is a schematic flowchart of another navigation method according to an embodiment of the present disclosure. In this embodiment of the present disclosure, a specific area includes at least two paths, where the at least two paths include K intersections, and K is greater than or equal to 1.

As shown in FIG. 12, steps S1201 to S1206 in the navigation method according to this embodiment are respectively the same as the steps S901 to S906 in the embodiment shown in FIG. 9. In addition to steps S1201 to S1206, the following specific steps are included.

Step S1207. The server obtains, according to the first location data, the second location data, and the pre-stored navigation data, a location data sequence corresponding to a walking route from the current location to the destination.

The location data sequence includes location data of at least two location points, the at least two location points are included in the at least two paths, the at least two location points include at least one of the K intersections, and a first intersection is a location point, of the at least one intersection, in a same path as the current location.

The server obtains, according to the first location data, the second location data, and the pre-stored navigation data, location data sequences corresponding to all walking routes through which the destination can be reached, and outputs a navigation instruction according to any location data sequence. FIG. 1C is used as an example for describing a path in a specific area, and navigation data is listed in Table 1. It is assumed that a current location of the terminal is a point A, and a destination is a point B. Location data sequences that may be obtained by the server according to location data of the point A, location data of the point B, and the pre-stored navigation data include (A→C1→C2→B) and (A→C1→C3→C2→B). The server may output a navigation instruction according to either of the location data sequences.

Figure 13:
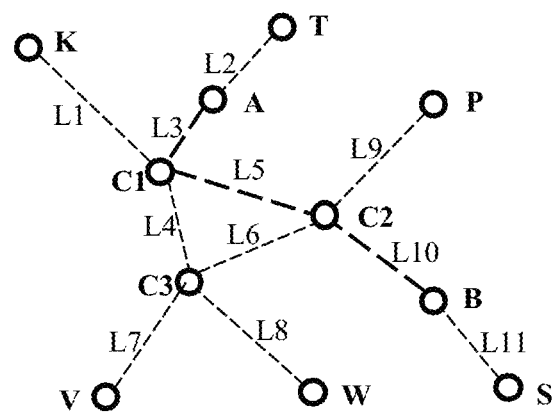
FIG. 13 is a schematic diagram of an undirected graph generated by a server according to navigation data.

Further, the server may calculate walking distances of walking routes corresponding to the location data sequences, and select a location data sequence corresponding to a walking route with a shortest walking distance. During specific implementation, the server may generate an undirected graph according to the navigation data. If the path in the specific area is shown in FIG. 1C, the undirected graph may be shown in FIG. 13. A walking route corresponding to the location data sequence (A→C1→C2→B) is L3+L5+L10, and a walking route corresponding to the location data sequence (A→C1→C3→C2→B) is L3+L4+L6+L10. By comparison, a shorter walking route is L3+L5+L10. Therefore, the server outputs a navigation instruction according to the location data sequence (A→C1→C2→B).

It should be noted that, the specific area has the at least two paths. If the current location and the destination are in a same path, and a walking path does not include an intersection, the navigation method in the embodiments of the present disclosure may be executed according to the embodiment shown in FIG. 9. If the current location and the destination are in a same path, a walking path includes an intersection, and a walking route passes through only one path, the navigation method in the embodiments of the present disclosure may be executed according to this embodiment of the present disclosure or the embodiment shown in FIG. 9.

Step S1208. The server outputs a first navigation instruction to the terminal if a relationship between the first location data and location data corresponding to a first intersection is the same as a preset relationship between a current location and a destination, where the first navigation instruction is used to instruct a user to move in a first direction, and the first direction is a direction corresponding to the first location data.

In the pre-stored navigation data, if sequence information of location points from a start point of a path in which the current location is located to an end point of the path in which the current location is located is in ascending order, and sequence information corresponding to the first location data is less than sequence information corresponding to the first intersection, the terminal should move in the direction corresponding to the first location data, and output the first navigation instruction.

In the pre-stored navigation data, if sequence information of location points from a start point of a path in which the current location is located to an end point of the path in which the current location is located is in descending order, and sequence information corresponding to the first location data is greater than sequence information corresponding to the first intersection, the terminal should move in the direction corresponding to the first location data, and output the first navigation instruction.

Step S1209. The server outputs a second navigation instruction to the terminal if a relationship between the first location data and location data corresponding to a first intersection is the same as a preset relationship between a current location and a destination, where the second navigation instruction is used to instruct a user to move in a second direction, and the second direction is a direction obtained after the first direction rotates 180°.

In the pre-stored navigation data, if sequence information of location points from a start point of a path in which the current location is located to an end point of the path in which the current location is located is in ascending order, and sequence information corresponding to the first location data is greater than sequence information corresponding to the first intersection, the terminal should move in the direction obtained after the direction corresponding to the first location data rotates 180°, and output the second navigation instruction.

In the pre-stored navigation data, if sequence information of location points from a start point of a path in which the current location is located to an end point of the path in which the current location is located is in descending order, and sequence information corresponding to the first location data is less than sequence information corresponding to the first intersection, the terminal should move in the direction obtained after the direction corresponding to the first location data rotates 180°, and output the second navigation instruction.

In this embodiment, for a specific process of determining the first direction and the second direction, reference may be made to the description in the embodiment shown in FIG. 9.

Further, if a difference between sequence information corresponding to the first location data and sequence information corresponding to the second location data is less than or equal to a preset threshold, an indication that a destination is reached is output. That sequence information is a time stamp is used as an example. It is assumed that the preset threshold is 5 s. If a difference between a time stamp corresponding to the first location data and a time stamp corresponding to the second location data is within 5 s, it indicates that a user has reached a destination. In this case, the server outputs, to the terminal, an indication that the destination is reached.

In another case, if the first location data is the same as the second location data, it indicates that a user has reached a destination. In this case, the server outputs, to the terminal, an indication that the destination is reached.

It should be noted that, the preset threshold may be set by the server, may be set by the user, or may be adjusted according to actual requirements. The present disclosure does not impose any limitation.

Step S1210. The terminal receives the first navigation instruction sent by the server, and outputs the navigation instruction.

Step S1211. The terminal receives the second navigation instruction sent by the server, and outputs the navigation instruction.

After receiving the navigation instruction sent by the server, the terminal may be carried by the user to a next location, obtain location data of the next location of the terminal, and send the location data of the next location to the server. If the server finds that in the pre-stored navigation data, there is no location data matching the location data of the next location, it indicates that the user has deviated from an original path currently. In this case, the user is helped to return to the original path. For a specific manner, reference may be made to the foregoing descriptions. Details are not described herein again.

It should be noted that, in the embodiment shown in FIG. 12, all steps performed by the server may alternatively be performed by the terminal. Details are not described herein again.

In the embodiment shown in FIG. 12, the first location data matching the location data of the current location and the second location data matching the location data of the destination are obtained by means of matching by the server using the pre-stored navigation data, the location data sequence is obtained according to the first location data, the second location data, and the pre-stored navigation data, and a navigation instruction is output to the terminal according to the location data sequence. In this way, a navigation function can be implemented in the specific area including the at least two paths, without a map and positioning.

The following describes, using three scenarios, the navigation method according to this embodiment of the present disclosure.

Figure 14:
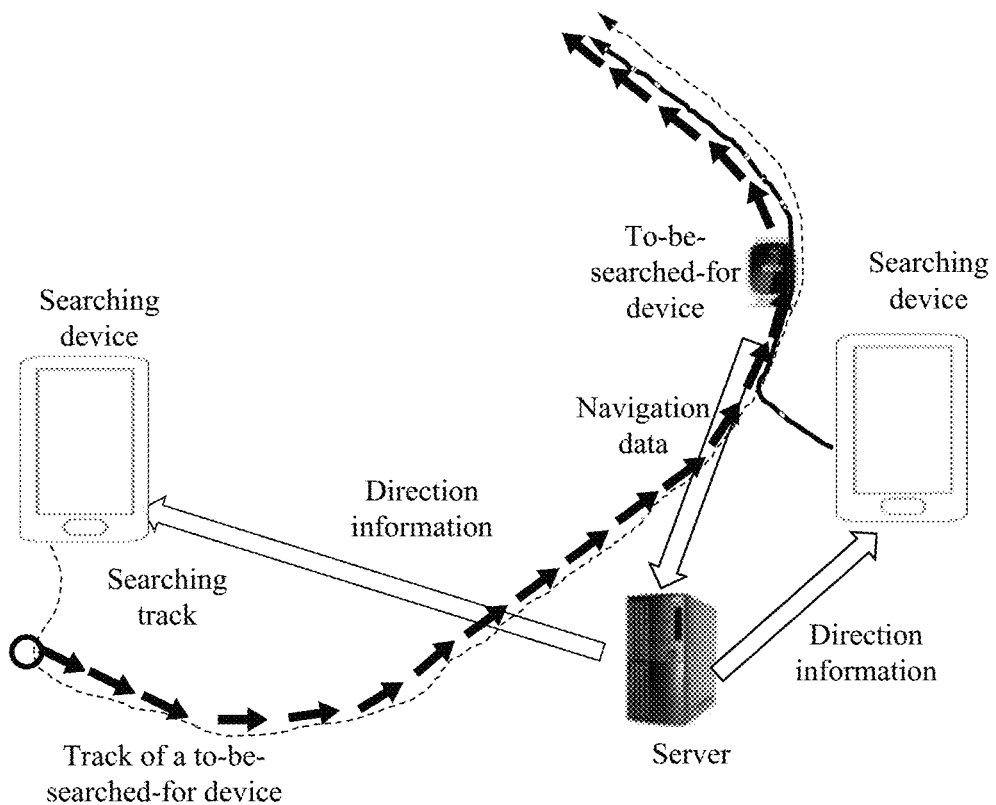
FIG. 14 is a schematic diagram of searching for a child using a navigation method according to an embodiment of the present disclosure.

Scenario 1: Searching for a Person or an Object, or Sharing Location Information A lost article or a missing child carries a communications device that can collect location data and a moving direction, and the communications device is a to-be-searched-for device, a communications device used for tracking the to-be-searched-for device is a searching device. That a missing child is tracked is used as an example. As shown in FIG. 14, the to-be-searched-for device keeps recording navigation data all the time and uploads the navigation data to the server. Therefore, it is equivalent that the server side has navigation data of a path from a current location of the searching device to a current location of the to-be-searched-for device (that is, a destination), and a moving path of the missing child is recorded in the navigation data. When the searching device enters the moving path of the child, the server may output, according to location data of the current location of the searching device and the navigation data uploaded by the to-be-searched-for device, a corresponding navigation instruction to the searching device in order to guide parents to search for the missing child.

Further, there may be one searching device or at least two searching devices used for tracking the to-be-searched-for device. If there are at least two searching devices, the server may further output a corresponding navigation instruction to a corresponding searching device according to location data of current locations of the searching devices and the navigation data uploaded by the to-be-searched-for device in order to guide the corresponding searching devices to search for the to-be-searched-for device. It should be noted that, a quantity of searching devices is not limited.

Certainly, the server may alternatively send, to the searching device, the navigation data uploaded by the to-be-searched-for device, and then the searching device itself implements a navigation function.

Scenario 2: Searching for a Car

Figure 15:
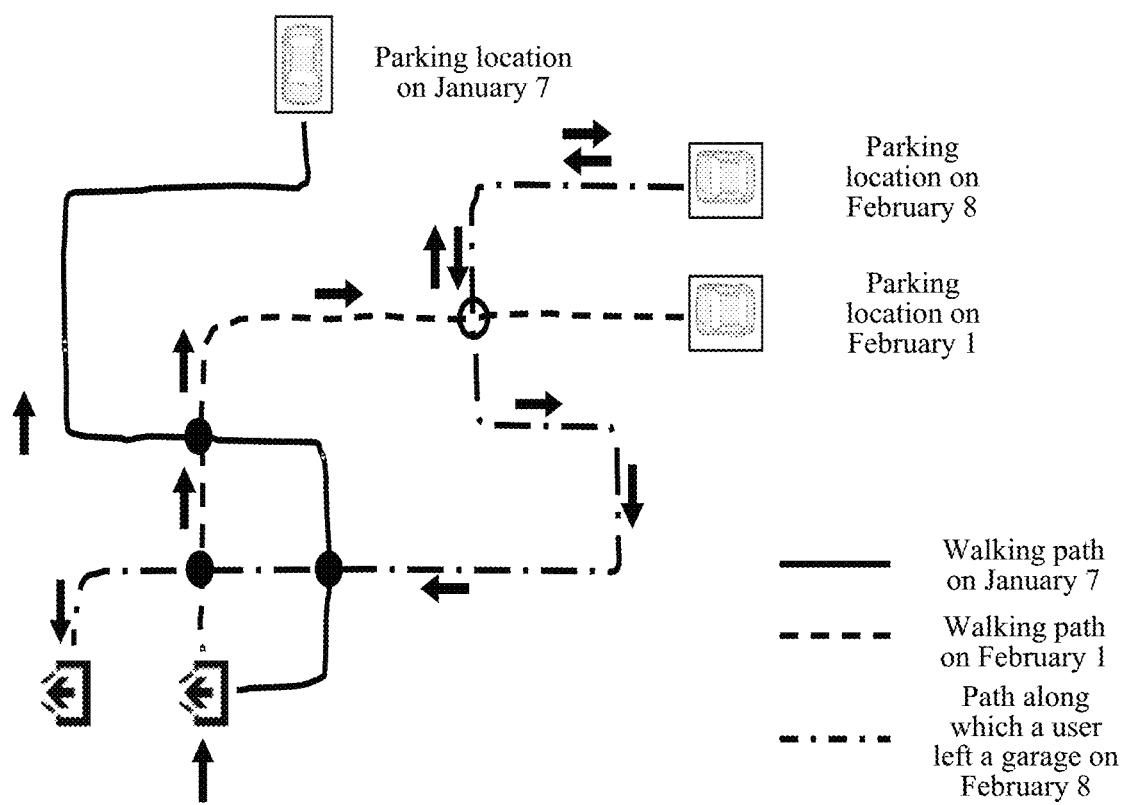
FIG. 15 is a schematic diagram of searching for a car in a garage using a navigation method according to an embodiment of the present disclosure.

A user parks a car in different locations of a garage sometimes, and may leave the garage from different exits along different paths after having parked the car. Each time after the car is parked, a terminal collects navigation data and uploads the navigation data to the server. Therefore, the server stores navigation data indicating a case each time the user leaves the garage after having parked the car. As shown in FIG. 15, the server has stored navigation data recorded by the terminal when the user left the garage after parking the car on Jan. 7, Feb. 1, and Feb. 8. When the user returned to the garage on Feb. 8 to search for the car, a user terminal may start collection of location data and upload the location data to the server. The server calculated a shortest path from an entry of the garage to a parking location according to stored historical navigation data, location data of a current location of the terminal, and location data recorded when the user parked the car on Feb. 8, and provided a navigation instruction using the user terminal. In that case, the user did not need to search for the car according to a path, from the entry of the garage to the parking location, along which the user left the garage on Feb. 8 (because that path is unnecessarily the shortest path). In this way, the historical data can be utilized to obtain the shortest walking route. Certainly, the terminal may alternatively not send the navigation data to the terminal, and the terminal itself implements a navigation function.

Scenario 3: Searching for a Location

This scenario is applicable to a specific place such as a shopping mall, a hotel, or a tourist attraction.

That a shopping mall is used as an example. A tester may carry a terminal to collect navigation data in advance, and marks a name identifier at an important location point. The name identifier and the navigation data that is collected at the same as the name identifier form a piece of record. For example, a user carries the terminal to walk from Chow Tai Fook (a name of a store) to Maybelline (a name of a store), walk from KFC (a name of a store) to Banelo (a name of a store), and walk from Anta (a name of a store) to Konka Electric Appliance (a name of a store). These three paths intersect at C1, C2, and C3, as shown in FIG. 1C. The terminal sends the collected navigation data to the server. The server stores and collects statistics on the navigation data uploaded by the terminal, to obtain the navigation data table shown in Table 1.

The user enters a name of a destination to enable navigation, the terminal uploads, to the server, the place name entered by the user, and the server obtains corresponding location data from the navigation data according to the name of the destination. As shown in FIG. 1C, assuming that the user wants to go to Banelo, the server determines, in the navigation data, navigation data of the destination is [1, 1, F1(1), A1(1), L1(1)]. At this time, the user is actually located in Chow Tai Fook. After navigation is started, the terminal collects data of a current location of the user, and uploads the data of the current location to the server. The server may identify, according to the data of the current location, that the user is in Chow Tai Fook, and obtain, by means of calculation according to the navigation data, that a location data sequence corresponding to a path from the user location to Banelo is P→C2→C1→K. In this case, the server outputs a navigation instruction to the terminal according to the location data sequence in order to guide the user to reach the destination.

Certainly, the terminal may alternatively not send the navigation data to the terminal, and the terminal itself implements a navigation function.

Figure 16:
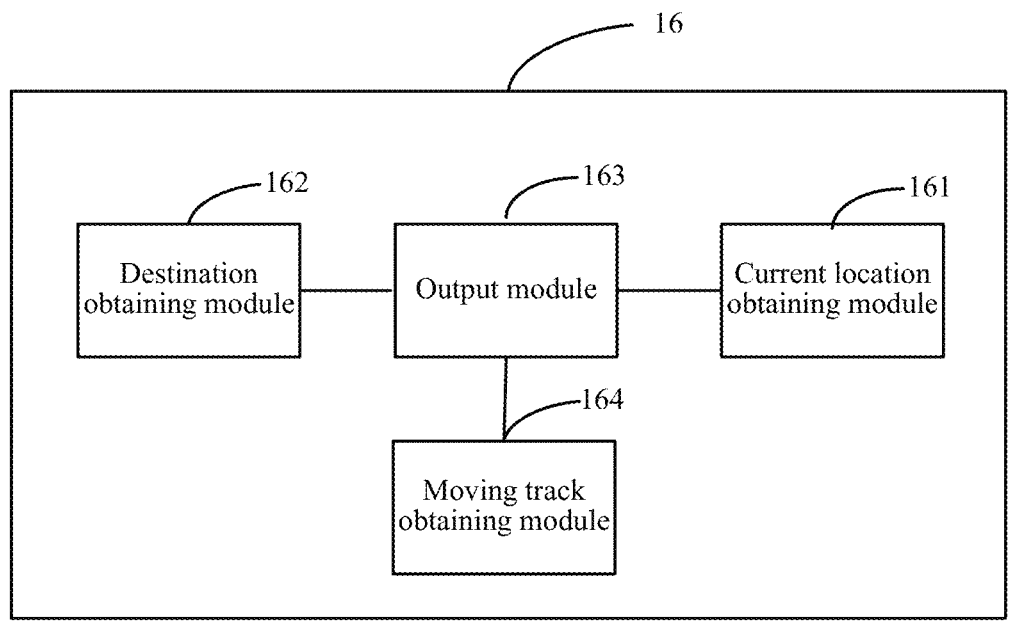
FIG. 16 is a schematic structural diagram of a navigation device according to an embodiment of the present disclosure.

Referring to FIG. 16, FIG. 16 is a schematic structural diagram of a navigation device 16 according to an embodiment of the present disclosure. The navigation device may be a terminal or may be a server. As shown in FIG. 16, the device includes a current location obtaining module 161, a destination obtaining module 162, and an output module 163.

The current location obtaining module 161 is configured to obtain location data of a current location of a terminal.

The destination obtaining module 162 is configured to obtain location data of a destination, where both the current location and the destination are included in the first path.

The destination obtaining module 162 is further configured to receive the location data of the destination sent by a first device, use previously obtained location data of a location point as the location data of the destination, or obtain an identifier, entered by a user on the terminal, of the destination, and obtain, from the pre-stored navigation data, the location data of the destination that is corresponding to the identifier of the destination.

The output module 163 is configured to output a first navigation instruction if a relationship between the first location data and the second location data is the same as a preset relationship between a current location and a destination, where the first navigation instruction is used to instruct the user to move in a first direction, and the first direction is a direction corresponding to the first location data, or output a second navigation instruction if a relationship between the first location data and the second location data is opposite to a preset relationship between a current location and a destination, where the second navigation instruction is used to instruct the user to move in a second direction, and the second direction is a direction obtained after the first direction rotates 180°.

In an optional implementation, in the pre-stored navigation data, sequence information of location points from a start point of the first path to an end point of the first path is in ascending order, and the output module 163 is further configured to output the first navigation instruction if sequence information corresponding to the first location data is less than sequence information corresponding to the second location data, or output the second navigation instruction if sequence information corresponding to the first location data is greater than sequence information corresponding to the second location data.

In another optional implementation, in the pre-stored navigation data, sequence information of location points from a start point of the first path to an end point of the first path is in descending order, and the output module 163 is further configured to output the first navigation instruction if sequence information corresponding to the first location data is greater than sequence information corresponding to the second location data, or output the second navigation instruction if sequence information corresponding to the first location data is less than sequence information corresponding to the second location data.

Further, the output module 163 is further configured to output an indication that a destination is reached if a difference between sequence information corresponding to the first location data and sequence information corresponding to the second location data is less than or equal to a preset threshold.

Optionally, the current location obtaining module 161 is further configured to, after the output module 163 outputs the first navigation instruction or the second navigation instruction, obtain location data of a next location of the terminal, the device 16 further includes a moving track obtaining module 164 configured to start to obtain a moving track of the terminal if in the pre-stored navigation data, there is no location data matching the location data of the next location, and the output module 163 is further configured to output a third navigation instruction according to the obtained moving track of the terminal, where the third navigation instruction is used to instruct the user to return to a previous location of the next location, and the pre-stored navigation data includes location data matching location data of the previous location of the next location.

Optionally, the current location obtaining module 161 is further configured to after the output module 163 outputs the first navigation instruction or the second navigation instruction, obtain location data of a next location of the terminal, and the output module 163 is further configured to, if in the pre-stored navigation data, there is no location data matching the location data of the next location, output a fourth navigation instruction according to a moving direction of the terminal when the location data of the next location is obtained and direction information of a previous location of the next location, where the fourth navigation instruction is used to instruct the user to return to the first path, and the pre-stored navigation data includes location data matching location data of the previous location of the next location and corresponding direction information.

It can be understood that, functions of function modules of the navigation device 16 in this embodiment may be further implemented according to the methods in the foregoing method embodiments. For details, reference may be correspondingly made to the related description of the method embodiment in FIG. 9 or FIG. 12. Details are not described herein again.

Figure 17:
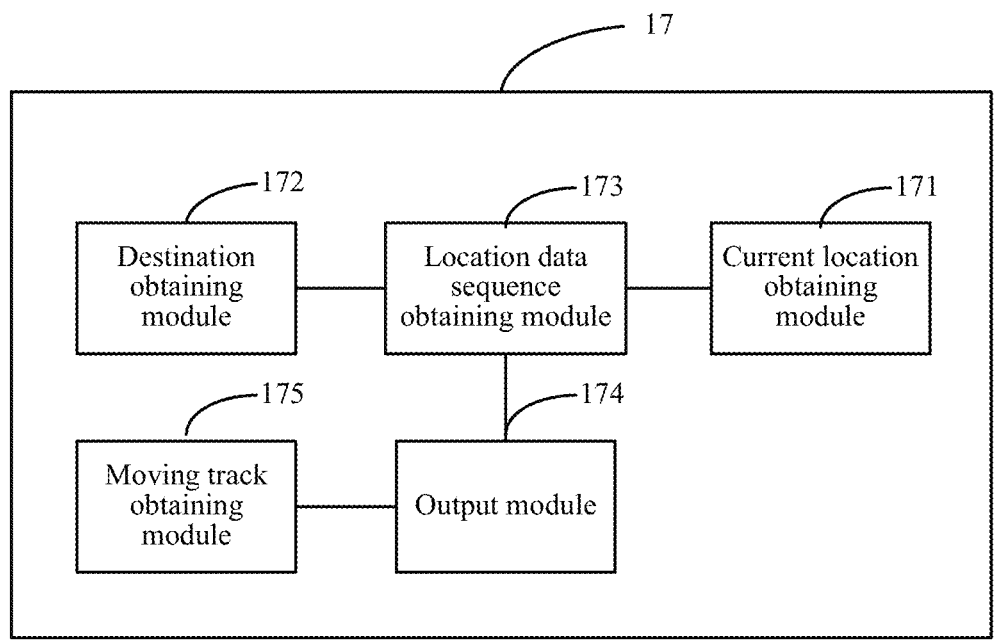
FIG. 17 is a schematic structural diagram of another navigation device according to an embodiment of the present disclosure.

Referring to FIG. 17, FIG. 17 is a schematic structural diagram of another navigation device 17 according to an embodiment of the present disclosure. The navigation device 17 may be a terminal or may be a server. As shown in FIG. 17, the device 17 includes a current location obtaining module 171, a destination obtaining module 172, a location data sequence obtaining module 173, and an output module 174.

The current location obtaining module 171 is configured to obtain location data of a current location of a terminal.

The destination obtaining module 172 is configured to obtain location data of a destination, where the current location and the destination are included in the at least two paths.

The destination obtaining module 172 is further configured to receive the location data of the destination sent by a first device, use previously obtained location data of a location point as the location data of the destination, or obtain an identifier, entered by a user on the terminal, of the destination, and obtain, from the pre-stored navigation data, the location data of the destination that is corresponding to the identifier of the destination.

The location data sequence obtaining module 173 is configured to obtain, according to the first location data, the second location data, and the pre-stored navigation data, a location data sequence corresponding to a walking route from the current location to the destination, where the location data sequence includes location data of at least two location points, the at least two location points are included in the at least two paths, the at least two location points include at least one of the K intersections, and a first intersection is a location point, of the at least one intersection, in a same path as the current location.

The pre-stored navigation data further includes information about a distance between any two adjacent location points of the M location points, and the location data sequence obtaining module 173 is further configured to obtain the location data sequence according to the first location data, the second location data, and the pre-stored navigation data, where the location data sequence corresponds to a shortest walking route from the current location to the destination.

The output module 174 is configured to output a first navigation instruction if a relationship between the first location data and location data corresponding to the first intersection is the same as a preset relationship between a current location and a destination, where the first navigation instruction is used to instruct the user to move in a first direction, and the first direction is a direction corresponding to the first location data, or output a second navigation instruction if a relationship between the first location data and location data corresponding to the first intersection is opposite to a preset relationship between a current location and a destination, where the second navigation instruction is used to instruct the user to move in a second direction, and the second direction is a direction obtained after the first direction rotates 180°.

In an optional implementation, in the pre-stored navigation data, sequence information of location points from a start point of a path in which the current location is located to an end point of the path in which the current location is located is in ascending order, and the output module 174 is further configured to output the first navigation instruction if sequence information corresponding to the first location data is less than sequence information corresponding to the first intersection, or output the second navigation instruction if sequence information corresponding to the first location data is greater than sequence information corresponding to the first intersection.

In another optional implementation, in the pre-stored navigation data, sequence information of location points from a start point of a path in which the current location is located to an end point of the path in which the current location is located is in descending order, and the output module 174 is further configured to output the first navigation instruction if sequence information corresponding to the first location data is greater than sequence information corresponding to the first intersection, or output the second navigation instruction if sequence information corresponding to the first location data is less than sequence information corresponding to the first intersection.

Further, the output module 174 is further configured to output an indication that a destination is reached if a difference between sequence information corresponding to the first location data and sequence information corresponding to the second location data is less than or equal to a preset threshold.

Optionally, the current location obtaining module 171 is further configured to, after the output module 174 outputs the first navigation instruction or the second navigation instruction, obtain location data of a next location of the terminal, the device 17 further includes a moving track obtaining module 175 configured to, if in the pre-stored navigation data, there is no location data matching the location data of the next location, start to obtain a moving track of the terminal, and the output module 174 is further configured to output a third navigation instruction according to the obtained moving track of the terminal, where the third navigation instruction is used to instruct the user to return to a previous location of the next location, and the pre-stored navigation data includes location data matching location data of the previous location of the next location.

Optionally, the current location obtaining module 171 is further configured to, after the output module 174 outputs the first navigation instruction or the second navigation instruction, obtain location data of a next location of the terminal, and the output module 174 is further configured to output a fourth navigation instruction according to a moving direction of the terminal when the location data of the next location is obtained and direction information of a previous location of the next location if in the pre-stored navigation data, there is no location data matching the location data of the next location, where the fourth navigation instruction is used to instruct the user to return to the first path, and the pre-stored navigation data includes location data matching location data of the previous location of the next location and corresponding direction information.

It can be understood that, functions of function modules of the navigation device 17 in this embodiment may be further implemented according to the methods in the foregoing method embodiments. For details, reference may be correspondingly made to the related description of the method embodiment in FIG. 9 or FIG. 12. Details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the method embodiments may be included. The foregoing storage medium may be a magnetic disk, an optical disc, a read-only memory (ROM), a RAM, or the like.

What is disclosed above is merely examples of embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A navigation method, used for a first area comprising a first path, comprising:
   obtaining location data of a current location of a terminal, wherein the current location of the terminal is a point S along the first path, and wherein location data of the current location of the terminal comprises data identifying the current location of the terminal;
   obtaining location data of a destination, wherein the location data of the destination comprises data identifying a location corresponding to the destination, wherein both the current location and the destination are comprised in the first path, wherein first location data in pre-stored navigation data matches the location data of the current location, and wherein second location data in the pre-stored navigation data matches the location data of the destination;
   determining whether a relationship between the first location data and the second location data is the same as a preset relationship between the current location and the destination;
   outputting a first navigation instruction when the relationship between the first location data and the second location data is the same as a preset relationship between the current location and the destination, wheren the first navigation instruction instructs a user to move in a first direction, and wherein the first direction corresponds to the first location data; and
   outputting a second navigation instruction when the relationship between the first location data and the second location data is opposite to the preset relationship between the current location and the destination, wherein the second navigation instruction instructs the user to move in a second direction, wherein the second direction is opposite to the first direction.

2. The method of claim 1, wherein the point S comprises any location on the first path including the current location of the terminal and the destination, wherein location data of the point S comprises data identifying the point S obtained by the terminal when the terminal is at the point S, wherein the location data of the point S comprises at least one of the following:
   an identifier and a characteristic of each wireless signal identifying the point S received by the terminal when the terminal is at the point S, wherein the identifier of the wireless signal identifies a wireless node sending the wireless signal, and wherein the characteristic of the wireless signal indicates a relationship between the terminal and the wireless node sending the wireless signal; and
   a sensor signal identifying the point S collected by the terminal when the terminal is at the point S, wherein the sensor signal comprises at least one of a geomagnetic signal, a light signal, or a pneumatic signal.

3. The method of claim 2, wherein the characteristic of the wireless signal comprises at least one of the following:
   a received signal strength of the wireless signal received by the terminal;
   a distance between the terminal and the wireless node sending the wireless signal;
   a radiation angle of a signal between the terminal and the wireless node sending the wireless signal;
   an angle of arrival of the signal between the terminal and the wireless node sending the wireless signal;
   a time of arrival of the signal between the terminal and the wireless node sending the wireless signal; or
   a time difference of arrival of signals between the terminal and the wireless node sending the wireless signal.

4. The method of claim 1, wherein the first path comprises M location points, and wherein the pre-stored navigation data comprising at least one of the following:
   location data of each of the M location points;
   direction information of each of the M location points indicate moving directions in which the M location points are passed through from a start point of the first path to an end point of the first path;
   sequence information of each of the M location points indicating a sequence in which the M location points are passed though the start point of the first path to the end point of the first path, wherein the sequence information of the M location points from the start point of the first path to the end point of the first path are in a ascending order or in a descending order.

5. The method of claim 4, wherein in the pre-stored navigation data, the sequence information of the M location points from the start point of the first path to the end point of the first path is in the ascending order, and wherein outputting the first navigation instruction and outputting the second navigation instruction comprises:
   outputting the first navigation instruction when sequence information corresponding to the first location data is less than sequence information corresponding to the second location data; and
   outputting the second navigation instruction when the sequence information corresponding to the first location data is greater than the sequence information corresponding to the second location data.

6. The method of claim 4, wherein in the pre-stored navigation data, the sequence information of the M location points from the start point of the first path to the end point of the first path is in the descending order, and wherein outputting the first navigation instruction and outputting the second navigation instruction comprises:
   outputting the first navigation instruction when sequence information corresponding to the first location data is greater than sequence information corresponding to the second location data; and
   outputting the second navigation instruction when the sequence information corresponding to the first location data is less than the sequence information corresponding to the second location data.

7. The method of claim 4, further comprising outputting an indication that the destination is reached when a difference between sequence information corresponding to the first location data and sequence information corresponding to the second location data is less than or equal to a preset threshold.

8. The method of claim 1, wherein obtaining the location data of the destination comprises at least one of the following:
   receiving the location data of the destination from a first device;
   setting previously obtained location data of a location point as the location data of the destination; or
   obtaining an identifier of the destination from the user on the terminal, and obtaining the destination corresponding to the identifier of the destination from the pre-stored navigation data.

9. The method of claim 1, wherein after outputting the first navigation instruction and the second navigation instruction, the method further comprises:

obtaining location data of a next location of the terminal;

starting to obtain a moving track of the terminal when there is no location data matching the location data of the next location in the pre-stored navigation data; and outputting a third navigation instruction according to the moving track of the terminal, wherein the third navigation instruction instructs the user to return to a previous location of the next location, and wherein the pre-stored navigation data comprises location data matching location data of the previous location of the next location.

10. The method of claim 1, wherein after outputting the first navigation instruction and the second navigation instruction, the method further comprises:

obtaining location data of a next location of the terminal; and outputting a fourth navigation instruction according to a moving direction of the terminal when there is no location data matching the location data of the next location in the pre-stored navigation data and when the location data of the next location comprises direction information of a previous location of the next location, wherein the fourth navigation instruction instructs the user to return to the first path, and wherein the pre-stored navigation data comprises location data matching location data of the previous location of the next location and corresponding direction information.

11. A navigation method, used for a second area comprising at least two paths, wherein the at least two paths comprise K intersections, where K is greater than or equal to one, and wherein the method comprises:

obtaining location data of a current location of a terminal;

obtaining location data of a destination, wherein the at least two parts cpmprise the current location and the destination, wherein first location data in pre-stored navigation data matches the location data of the current location, and wherein second location data in the pre-stored navigation data matches the location data of the destination;

obtaining a location data sequence corresponding to a walking route from the current location to the destination according to the first location data, the second location data, and the pre-stored navigation data, wherein the location data sequence comprises location data of at least two location points, wherein the at least two paths comprises the at least two location points, wherein the at least two location points comprise at least one of the K intersections, and wherein a first intersection comprises a location point of the at least one of the K intersections in a same path as the current location;

outputting a first navigation instruction when a relationship between the first location data and location data corresponding to the first intersection is the same as a preset relationship between the current location and the destination, the first navigation instruction instructs a user to move in a first direction, and wherein the first direction corresponds to the first location data; and outputting a second navigation instruction when the relationship between the first location data and the location data corresponding to the first intersection is opposite to the preset relationship between the current location and the destination, wherein the second navigation instruction instructs the user to move in a second direction, wherein the second direction is opposite to the first direction, a point S comprises any location point in the at least two paths, and wherein location data of the point S comprises data identifying the point S obtained by the terminal when the terminal is at the point S.

12. The method of claim 11, wherein the location data of the point S comprises at least one of the following:

an identifier and a characteristic of each wireless signal identifying the point S received by the terminal when the terminal is at the point S, wherein the identifier of the wireless signal identifies a wireless node sending the wireless signal, and wherein the characteristic of the wireless signal indicates a relationship between the terminal and the wireless node sending the wireless signal; and a sensor signal identifying the point S collected by the terminal when the terminal is at the point S, wherein, the sensor signal comprises at least one of a geomagnetic signal, a light signal, or a pneumatic signal.

13. The method of claim 12, wherein the characteristic of the wireless signal comprises at least one of the following:

a received signal strength of the wireless signal received by the terminal;

a distance between the terminal and the wireless node sending the wireless signal;

a radiation angle of a signal between the terminal and the wireless node sending the wireless signal;

an angle of arrival of the signal between the terminal and the wireless node sending the wireless signal;

a time of arrival of the signal between the terminal and the wireless node sending the wireless signal; or a time difference of arrival of signals between the terminal and the wireless node sending the wireless signal.

14. The method of claim 11, wherein each path of the at least two paths comprises M location points, and wherein the pre-stored navigation data comprises at least one of the following:

location data of each of the M location points;

direction information of each of the M location points; and sequence information and a path identifier of each of the M location points, direction information of the M location points indicating moving directions in which the M location points are passed through from a start point of a path in which the M location points are located to an end point of the path in which the M location points are located, sequence information of the M location points indicating a sequence in which the M location points are passed through from the start point of the path in which the M location points located to the end point of the path in which the M location points are located, wherein the sequence information of the M location points from the start point of the path in which the location points are located to the end point of the path in which the M location points located are in an ascending order or in a descending order, or path identifiers of the M location points identifying the path in which the M location points are located.

15. The method of claim 14, wherein the pre-stored navigation data further comprises information about a distance between any two adjacent location points of the M location points, wherein obtaining the location data sequence corresponding to the walking route from the current location to the destination comprises obtaining the location data sequence according to the first location data, the second location data, and the pre-stored navigation data, and the location data sequence corresponding to a shortest walking route from the current location to the destination.

16. The method of claim 14, wherein in the pre-stored navigation data, the sequence information of the M location points from the start point of the path in which the current location is located to the end point of the path in which the current location is located is in the ascending order, and wherein outputting the first navigation instruction and outputting the second navigation instruction comprises:

outputting the first navigation instruction when sequence information corresponding to the first location data is less than sequence information corresponding to the first intersection; and outputting the second navigation instruction when the sequence information corresponding to the first location data is greater than the sequence information corresponding to the first intersection.

17. The method of claim 14, wherein in the pre-stored navigation data, the sequence information of the M location points from the start point of the path in which the current location is located to the end point of the path in which the current location is located is in the descending order, and wherein outputting the first navigation instruction and outputting the second navigation instruction comprises:

outputting the first navigation instruction when sequence information corresponding to the first location data is greater than sequence information corresponding to the first intersection; and outputting the second navigation instruction when the sequence information corresponding to the first location data is less than the sequence information corresponding to the first intersection.

18. The method of claim 14, further comprising outputting an indication that the destination is reached when a difference between sequence information corresponding to the first location data and sequence information corresponding to the second location data is less than or equal to a preset threshold.

19. The method of claim 11, wherein obtaining the location data of the destination comprises at least one of the following:

receiving the location data of the destination from a first device;

setting previously obtained location data of a location point as the location data of the destination; or obtaining an identifier of the destination from the user on the terminal, and obtaining the location data of the destination corresponding to the identifier of the destination from the pre-stored navigation data.

20. The method of claim 11, wherein after outputting the first navigation instruction and the second navigation instruction, the method further comprises:

obtaining location data of a next location of the terminal;

starting to obtain a moving track of the terminal when there is no location data matching the location data of the next location in the pre-stored navigation data; and outputting a third navigation instruction according to the moving track of the terminal, wherein the third navigation instruction instructs the user to return to a previous location of the next location, and wherein the pre-stored navigation data comprises location data matching location data of the previous location of the next location.

\* \* \* \* \*

UNITED STATES PATENT AND TRADEMARK OFFICE
CERTIFICATE OF CORRECTION

PATENT NO. : 10,823,577 B2  
APPLICATION NO. : 15/781362  
DATED : November 3, 2020  
INVENTOR(S) : Xiaoping Zhang Page 1 of 1

It is certified that error appears in the above-identified patent and that said Letters Patent is hereby corrected as shown below:

In the Claims

Claim 8, Column 36, Line 62: "and obtaining the destination" should read "and obtaining the location data of the destination"

Claim 11, Column 37, Line 34: "two parts cpmprise" should read "two paths comprise"

Claim 11, Column 37, Line 46: "two paths comprises" should read "two paths comprise"

Claim 11, Column 37, Line 56: "destination, the first" should read "destination, wherein the first"

Claim 11, Column 37, Line 66: "direction, a point S" should read "direction, wherein a point S"

Claim 12, Column 38, Line 15: "S, wherein," should read "S, wherein"

Claim 14, Column 38, Line 54: "location points located are in" should read "location points are located are in"

Signed and Sealed this  
Twenty-second Day of December, 2020

Andrei Iancu  
*Director of the United States Patent and Trademark Office*